US012757260B2

(12) United States Patent
Wódczak

(10) Patent No.: US 12,757,260 B2
(45) Date of Patent: Oct. 6, 2026

(54) APPARATUS AND METHOD FOR CONTROLLING NETWORK ENTITY IN COMMUNICATION NETWORK

(71) Applicant: Samsung Electronics Co., Ltd., Suwon-si (KR)

(72) Inventor: Michał Wódczak, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 18/414,783

(22) Filed: Jan. 17, 2024

(65) Prior Publication Data

US 2024/0224346 A1 Jul. 4, 2024

Related U.S. Application Data

(63) Continuation of application No. PCT/KR2023/012496, filed on Aug. 23, 2023.

(30) Foreign Application Priority Data

Sep. 21, 2022 (KR) ........................ 10-2022-0119592
Oct. 11, 2022 (KR) ........................ 10-2022-0129879

(51) Int. Cl.
*H04W 76/10* (2018.01)
*H04B 7/15* (2006.01)
(Continued)

(52) U.S. Cl.
CPC .............. *H04W 76/10* (2018.02); *H04B 7/15* (2013.01); *H04L 1/0643* (2013.01); *H04W 72/044* (2013.01); *H04W 72/20* (2023.01)

(58) Field of Classification Search
CPC ... H04W 76/10; H04W 72/044; H04W 72/20; H04W 36/08; H04W 76/15; H04W 84/04; H04W 88/04; H04B 7/15; H04L 1/0643
(Continued)

(56) References Cited

U.S. PATENT DOCUMENTS

2009/0233544 A1* 9/2009 Oyman .............. H04B 7/15592 455/7
2009/0319674 A1* 12/2009 Yahyaoui ............ H04L 61/2578 709/228
(Continued)

FOREIGN PATENT DOCUMENTS

KR 20220030277 A 3/2022
KR 20220096875 A 7/2022
(Continued)

OTHER PUBLICATIONS

3GPP TR 22.866 V17.1.0, 3rd Generation Partnership Project; Technical Specification Group Services and System Aspects, Release 17, 43 pages, Dec. 2019, enhanced Relays for Energy Efficiency and Extensive Coverage.
(Continued)

*Primary Examiner* — Obaidul Huq
(74) *Attorney, Agent, or Firm* — Nixon & Vanderhye, P.C.

(57) ABSTRACT

An example method performed by a first access and mobility management function (AMF) of a wireless communication system may include establishing a control channel connection with at least two enhanced relays (ERs) through a first base station managed by the first AMF; controlling the at least two ERs to establish a communication channel with a second base station distinct from the first base station through the control channel; and controlling the at least two ERs to transmit data received through the communication channel to a first user equipment (UE).

18 Claims, 15 Drawing Sheets

(51) Int. Cl.

| | |
|---|---|
| ***H04L 1/06*** | (2006.01) |
| ***H04W 72/044*** | (2023.01) |
| ***H04W 72/20*** | (2023.01) |

(58) Field of Classification Search

USPC .................................................. 370/310, 315

See application file for complete search history.

(56) References Cited

U.S. PATENT DOCUMENTS

| | | | | |
|---|---|---|---|---|
| 2020/0008173 | A1 | 1/2020 | Kim et al. | |
| 2020/0052775 | A1* | 2/2020 | Nam .................. | H04B 7/15592 |
| 2020/0100088 | A1 | 3/2020 | Kim | |
| 2021/0226730 | A1* | 7/2021 | Yoon ..................... | H04L 1/0003 |
| 2021/0345104 | A1* | 11/2021 | Cheng ............... | H04W 12/0433 |
| 2022/0225448 | A1 | 7/2022 | Li | |
| 2022/0369215 | A1 | 11/2022 | Dees | |
| 2023/0336966 | A1 | 10/2023 | Wodczak | |
| 2023/0422075 | A1* | 12/2023 | Lim .................... | H04W 64/003 |
| 2024/0129820 | A1 | 4/2024 | Mochizuki et al. | |
| 2024/0413942 | A1* | 12/2024 | Hindy .................. | H04B 7/0626 |
| 2024/0429979 | A1* | 12/2024 | Dey ....................... | H04B 17/14 |

FOREIGN PATENT DOCUMENTS

| | | | |
|---|---|---|---|
| WO | 2022/181526 | | 2/2022 |
| WO | 2022145837 | A1 | 7/2022 |
| WO | 2022220376 | A1 | 10/2022 |

OTHER PUBLICATIONS

Höyhtyä et al., Review of Latest Advances in 3GPP Standardization: D2D Communication in 5G Systems and Its Energy Consumption Models, Future Internet, 18 pages, Published Jan. 3, 2018, MDPI.

Kim et al., 3GPP SA2 architecture and functions for 5G mobile communication system, ICT Express 3, pp. 1-8, Available Apr. 13, 2017, ScienceDirect.

Mahmoud et al., 6G: A comprehensive survey on technologies, applications, challenges, and research problems, Transactions on Emerging Telecommunications Technologies, 15 pages, 2021, Wiley.

Public Safety LTE (PS LTE) Network, Online Article, 4 pages, 2021.

Public Safety LTE Solution, www.samsungnetworks.com, pp. 1-8, Samsung, 2016.

Tabbane, LTE Planning and dimensioning, ITU PITA Workshop on Mobile network planning and security, 121 pages, Oct. 2019.

6G The Next Hyper-Connected Experience for All, 46 pages, Issued by Samsung Research.

Wódczak, Simulation Environment for Autonomic Cooperative Networking in Indoor Scenario, 14th International Conference on Modelling and Simulation, pp. 580-585, 2012, IEEE.

International Search Report for PCT/KR2023/012496 mailed Nov. 29, 2023, 6 pages.

Written Opinion of the ISA for PCT/KR2023/012496 mailed Nov. 29, 2023, 4 pages.

Samsung, "The Next Hyper-Connected Experience for All." Samsung 6G Vision, issued by Samsung Research, Jul. 14, 2020, 46 pages.

* cited by examiner

APPARATUS AND METHOD FOR CONTROLLING NETWORK ENTITY IN COMMUNICATION NETWORK

CROSS-REFERENCE TO RELATED APPLICATIONS

This application is a continuation of International Patent Application No. PCT/KR2023/012496, designating the United States, filed Aug. 23, 2023, in the Korean Intellectual Property Receiving Office, and claiming priority to Korean Patent Application No. 10-2022-0119592, filed Sep. 21, 2022, in the Korean Intellectual Property Office and to Korean Patent Application No. 10-2022-0129879, filed Oct. 11, 2022, in the Korean Intellectual Property Office. The contents of each of these applications are incorporated herein in their entireties.

BACKGROUND

Field

The disclosure relates to an apparatus and method for controlling a network entity in a communication network.

Description of Related Art 5G mobile communication technology defines a wide frequency band to enable fast transmission speed and new services, and can also be implemented not only in a frequency band below 6 GHZ ('sub 6 GHz') such as 3.5 Giga Hertz (3.5 GHz), etc., but also in an ultra-high frequency band ('above 6 GHz') called millimeter wave (mmWave) such as 28 GHZ, 39 GHz, etc. Also, in the case of 6G mobile communication technology, which is called a beyond-5G system, implementation in Terahertz (THz) bands (e.g., 95 GHz to 3 Terahertz bands) is being considered in order to achieve a transmission speed that is 50 times faster than 5G mobile communication technology and an ultra-low latency that is reduced to 1/10.

In the early days of 5G mobile communication technology, with the goal of service support and performance requirements satisfaction for enhanced mobile broadband (eMBB), ultra-reliable low-latency communications (URLLC), and massive machine-type communications (mMTC), progress has been made for the standardization of beamforming and massive MIMO for mitigating a path loss of radio waves in an ultra-high frequency band and increasing a propagation distance of radio waves, various numerology support (multiple subcarrier interval operation, etc.) for efficient use of ultra-high frequency resources and dynamic operation for slot format, an initial access technology for supporting multi-beam transmission and broadband, a definition and operation of band-width part (BWP), a new channel coding method such as a low density parity check (LDPC) code for large-capacity data transmission and a polar code for reliable transmission of control information, L2 pre-processing, network slicing providing a dedicated network specialized for a specific service, and the like.

Currently, discussions are in progress to improve and enhance the initial 5G mobile communication technology in consideration of services that 5G mobile communication technology is intended to support. Physical layer standardization is in progress for technologies such as vehicle-to-everything (V2X) for helping autonomous vehicles drive and increasing a user convenience, based on their location and status information transmitted by the vehicles, new radio unlicensed (NR-U) for the purpose of system operation which meets various regulatory requirements in unlicensed bands, NR UE power saving technology, a non-terrestrial network (NTN) that is UE-satellite direct communication for securing coverage in areas where communication with a terrestrial network is impossible, positioning, and the like.

In addition, standardization in the field of air interface architecture/protocol is also in progress for technologies such as industrial Internet of things (IIoT) for supporting new services through linkage and convergence with other industries, integrated access and backhaul (IAB) providing a node for expanding a network service area by integrating and supporting a wireless backhaul link and an access link, a mobility enhancement technology including conditional handover and dual active protocol stack (DAPS) handover, 2-step random access (2-step RACH for NR) that simplifies a random access procedure, and the like, and standardization in the field of system architecture/service is also in progress for a 5G baseline architecture (e.g., a service based architecture, and a service based interface) for grafting network functions virtualization (NFV) and software-defined networking (SDN) technologies, mobile edge computing (MEC) for which services are provided based on a location of UE, and the like.

When such a 5G mobile communication system is commercialized, an explosively increasing number of connected devices will be connected to a communication network and accordingly, it is expected that the function and performance enhancement of the 5G mobile communication system and the integrated operation of the connected devices will be required. To this end, new research will be conducted on extended reality (XR) for efficiently supporting augmented reality (AR), virtual reality (VR), mixed reality (MR), etc., 5G performance improvement and complexity reduction that utilize an artificial intelligence (AI) and machine learning (ML), AI service support, metaverse service support, drone communication, and the like.

Also, the development of such a 5G mobile communication system could be the basis for the development of not only a new waveform for guaranteeing coverage in a Terahertz band of 6G mobile communication technology, a multi-antenna transmission technology such as full dimensional MIMO (FD-MIMO), array antenna, and large scale antenna, a metamaterial-based lens and antenna to improve the coverage of Terahertz band signals, a high-dimensional spatial multiplexing technology that uses orbital angular momentum (OAM), and a reconfigurable intelligent surface (RIS) technology, but also a full duplex technology for improving a frequency efficiency of 6G mobile communication technology and improving a system network, a satellite, an AI-based communication technology that realizes system optimization by utilizing an artificial intelligence (AI) from a design stage and internalizing an end-to-end AI-supported function, a next-generation distributed computing technology that realizes a complex service beyond the limit of a UE computing capability by utilizing ultra-high-performance communication and computing resources, and the like.

SUMMARY

User equipment (UE) can establish a communication connection for data transmission and/or reception with one base station among a plurality of base stations. For example, a UE can establish a communication connection with a first base station capable of establishing a communication channel having a high channel quality among the plurality of base stations.

Meanwhile, there may be a change in the communication environment while the UE establishes a communication connection with a first base station and receives data. For example, a first cell of the first base station may be overloaded, or there may be a malfunction in the first base station.

In a case that the first cell is overloaded or there is a malfunction in the first base station, communication quality between the UE and the first base station may be degraded, and a user of the UE may experience an inconvenience in using a network.

In an example embodiment, a method performed by a first access and mobility management function (AMF) in a wireless communication system may include establishing a control channel connection with at least two enhanced relays (ERs) through a first base station managed by the first AMF; controlling the at least two ERs to establish a communication channel with a second base station distinct from the first base station through the control channel; and controlling the at least two ERs to transmit data received through the communication channel to a first user equipment (UE).

In an example embodiment, a server supporting a first access and mobility management function (AMF) in a wireless communication system may include a transceiver, and at least one processor coupled to the transceiver. The at least one processor may establish a control channel connection with at least two enhanced relays (ERs) through a first base station managed by the first AMF; control the at least two ERs to establish a communication channel with a second base station distinct from the first base station through the control channel; and control the at least two ERs to transmit data received through the communication channel, to a first user equipment (UE) that has established a first communication connection with the at least two ERs.

According to various example embodiments disclosed herein, degradation of communication quality between UE and at least two ERs may be reduced or prevented.

In addition to this, various effects identified directly or indirectly through this disclosure may be provided.

BRIEF DESCRIPTION OF THE DRAWINGS

The above and other aspects, features and advantages of certain embodiments of the present disclosure will be more apparent from the following detailed description taken in conjunction with the accompanying drawings, in which.

In connection with the description of the drawings, the same or similar reference numerals may be used for the same or similar elements.

DETAILED DESCRIPTION

Hereinafter, various example embodiments of the present disclosure will be described with reference to the accompanying drawings. However, it should be understood that this is not intended to limit the present disclosure to specific embodiment forms, and includes various modifications, equivalents, and/or alternatives of embodiments of the present disclosure.

Figure 1:
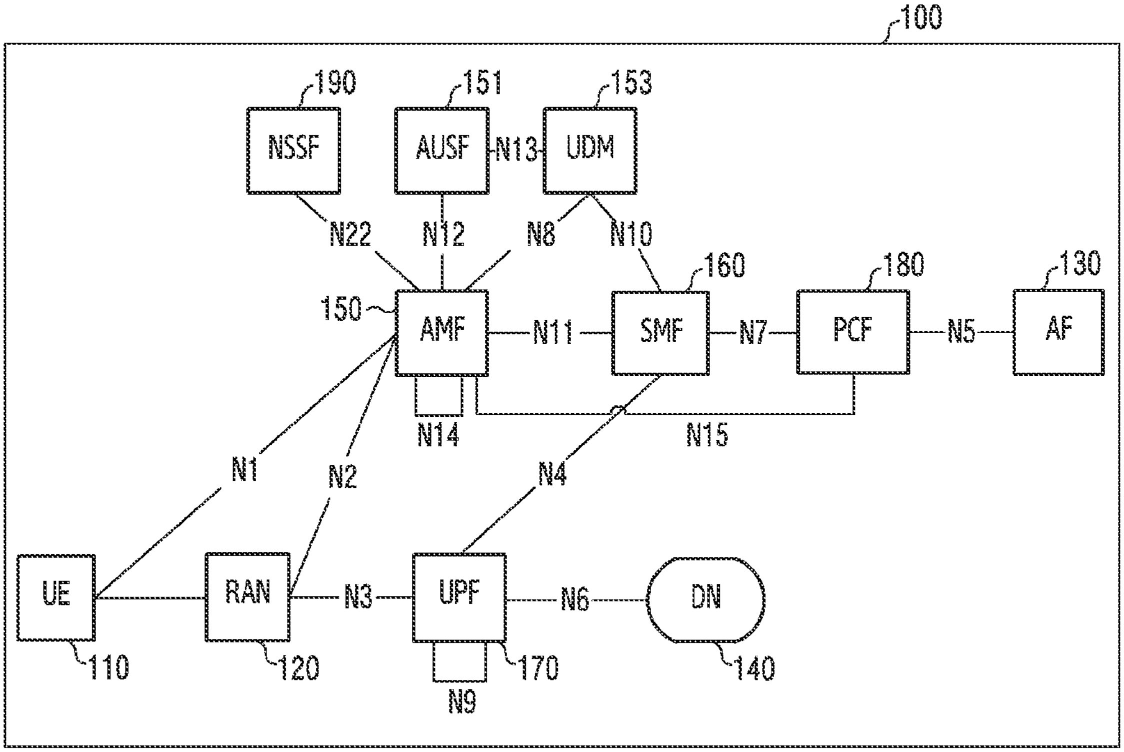
FIG. 1 illustrates an example communication network including core network entities in a wireless communication system according to various embodiments.

FIG. 1 illustrates an example communication network including core network entities in a wireless communication system according to various embodiments. The 5G mobile communication network 100 may include a 5G user equipment (UE) 110, a 5G radio access network (RAN) 120, and a 5G core network.

The 5G core network may include an access and mobility management function (AMF) 150 that presents a mobility management function of the UE, a session management function (SMF) 160 that presents a session management function, a user plane function (UPF) 170 that performs a data transfer role, a policy control function (PCF) 180 that presents a policy control function, a unified data management (UDM) 153 that presents a data management function such as subscriber data and policy control data, or network functions such as a unified data repository (UDR) for storing data of various network functions.

Referring to FIG. 1, the user equipment (UE) 110 may perform communication through a wireless channel formed with a base station (e.g., eNB or gNB), that is, an access network. In various embodiments, the UE 110 is a device used by a user, and may be a device configured to present a user interface (UI). As an example, the UE 110 may be a terminal equipped on a vehicle for driving. In various other embodiments, the UE 110 may be a device that performs machine type communication (MTC) operated without user involvement, or may be an autonomous vehicle. UE may, for example, be referred to as, besides an electronic device, 'terminal', 'vehicle terminal', 'user equipment (UE)', 'mobile station', 'subscriber station', 'remote terminal', 'wireless terminal', or 'user device' or other terms having equivalent technical meaning. As the terminal, a customer-premises equipment (CPE) or dongle type terminal may be used in addition to the UE. While the customer-premises equipment is connected to an NG-RAN node like the UE, the customer-premises equipment may present a network to other communication equipment (e.g., laptop).

According to various embodiments of the present disclosure, the UE 110 may refer to terminals included in a communication group that performs cooperative transmission. Also, the communication group may be a group formed between terminals receiving services from different networks, and the terminals participating in the communication group may transmit data in cooperation. According to various embodiments of the present disclosure, cooperative transmission may, for example, refer to a method in which a plurality of terminals belonging to a communication group perform modulation on the same data using different modulation schemes and transmit data. That is, cooperative transmission may, for example, refer to the plurality of terminals belonging to the communication group in an overlapping network performing cooperative physical layer (PHY) coding. According to an embodiment, in order for the terminals belonging to the communication group to perform cooperative transmission, each terminal may perform modulation in a row of a space-time block coding (STBC) matrix allocated to each terminal.

Referring to FIG. 1, the AMF 150 presents a function for access and mobility management by the unit of UE 110, and each UE 110 may be basically connected to one AMF 150. Specifically, the AMF 150 may perform a function of at least one of signaling between core network nodes for mobility between 3GPP access networks, an interface (N2 interface) between radio access networks (e.g., 5G RAN) 120, NAS signaling with the UE 110, identification of the SMF 160, and provision of delivery of a session management (SM) message between the UE 110 and the SMF 160. Some or all of the functions of the AMF 150 may be supported within a single instance of one AMF 150.

In a 3GPP system, conceptual links connecting between network functions (NFs) in a 5G system may be referred to as reference points. The reference point may also be referred to as an interface. The following illustrates reference points included in a 5G system architecture expressed over FIG. 1 to FIG. 7.

Figure 2A:
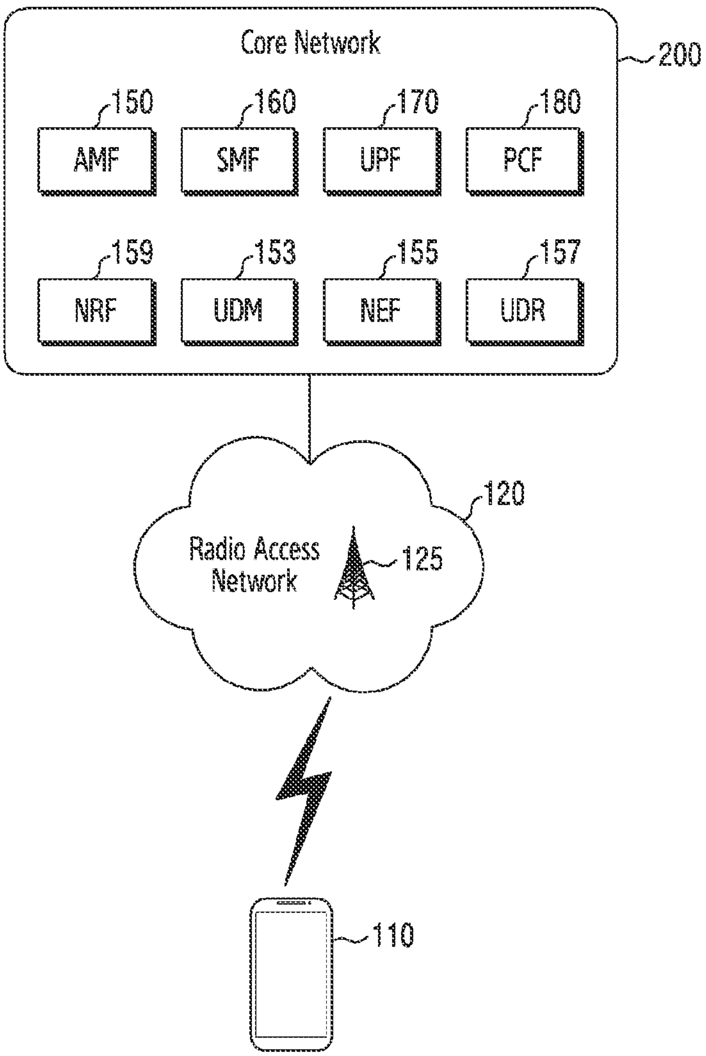
FIG. 2A illustrates a wireless environment including an example core network in a wireless communication system according to various embodiments.

N1: reference point between UE 110 and AMF 150
N2: reference point between (R) AN 120 and AMF 150
N3: reference point between (R) AN 120 and UPF 170
N4: reference point between SMF 160 and UPF 170
N5: reference point between PCF 180 and AF 130
N6: reference point between UPF 170 and DN 140
N7: reference point between SMF 160 and PCF 180
N8: reference point between UDM 153 and AMF 150
N9: reference point between two core UPFs 170
N10: reference point between UDM 153 and SMF 160
N11: reference point between AMF 150 and SMF 160
N12: reference point between AMF 150 and authentication server function (AUSF) 151
N13: reference point between UDM 153 and authentication server function 151
N14: reference point between two AMFs 150
N15: reference point between PCF 180 and AMF 150 in case of non-roaming scenario, and reference point between PCF 180 and AMF 150 within a visited network in case of roaming scenario FIG. 2A illustrates a wireless environment including an example core network 200 in a wireless communication system according to various embodiments.

Referring to FIG. 2A, the wireless communication system includes a radio access network (RAN) 120 and the core network (CN) 200.

The radio access network 120 is a network directly connected to a user device, for example, UE 110, and is an infrastructure that presents radio access to the UE 110. The radio access network 120 includes a set of a plurality of base stations including a base station 125, and the plurality of base stations may perform communication through an interface formed between them. At least some of the interfaces between the plurality of base stations may be wired or wireless. The base station 125 may have a structure that is divided into a central unit (CU) and a distributed unit (DU). In this case, one CU may control a plurality of DUs. The base station 125 may also be referred to as, for example, 'access point (AP)', 'next generation node B (gNB)', '5th generation (5G) node', 'wireless point', 'transmission/reception point (TRP)', or other terms having an equivalent technical meaning. The UE 110 accesses the radio access network 120, and communicates with the base station 125 through a wireless channel. The UE 110 may also be referred to as, for example, 'user equipment (UE)', 'mobile station', 'subscriber station', 'remote terminal', 'wireless terminal', or 'user device' or other terms having an equivalent technical meaning.

The core network 200 is a network that manages the entire system, and controls the radio access network 120, and processes data and control signals for the UE 110 transmitted and received through the radio access network 120. The core network 200 performs various functions such as controlling a user plane and a control plane, processing mobility, managing subscriber information, charging, and interworking with other types of systems (e.g., long term evolution (LTE) systems). In order to perform the various functions described above, the core network 200 may include a plurality of functionally separated entities having different network functions (NFs). For example, the core network 200 may include an access and mobility management function (AMF) 150, a session management function (SMF) 160, a user plane function (UPF) 170, a policy and charging function (PCF) 180, a network repository function (NRF) 159, a user data management (UDM) 153, a network exposure function (NEF) 155, and a unified data repository (UDR) 157.

The UE 110 is connected to the radio access network 120 and accesses the AMF 150 that performs a mobility management function of the core network 200. The AMF 150 is a function or device that takes charge of all access of the radio access network 120 and mobility management of the UE 110. The SMF 160 is an NF that manages sessions. The AMF 150 is connected to the SMF 160, and the AMF 150 routes a session related message for the UE 110 to the SMF 160. The SMF 160 connects to the UPF 170, allocates user plane resources to be presented to the UE 110, and establishes a tunnel for transmitting data between the base station 125 and the UPF 170.

The PCF 180 controls information related to policy and charging for a session used by the UE 110. The NRF 159 performs a function of storing information on NFs installed in a mobile communication operator's network and notifying the stored information. The NRF 159 may be connected to all NFs. When each NF starts driving in the operator's network, each NF registers with the NRF 159, thereby notifying the NRF 159 that a corresponding NF is driving in the network. The UDM 153 is an NF performing a role similar to a home subscriber server (HSS) of a 4G network, and stores subscription information of the UE 110, or context used by the UE 110 in a network.

The NEF 155 performs a role of connecting a 3rd party server and an NF in a 5G mobile communication system. The NEF 155 also performs a role of presenting data to the UDR 157, updating, or acquiring data. The UDR 157 performs a role of storing subscription information of the terminal 110, storing policy information, storing data exposed to the outside, or storing information necessary for a 3rd party application. Also, the UDR 157 performs a role of presenting stored data to other NFs.

According to embodiments of the present disclosure, the radio access network 120 may include the base station 125. The base station 125 may be a network infrastructure that presents radio access to the UE 110. The base station 125 may have coverage defined as a certain geographic area, based on a distance over which a signal may be transmitted. The base station 125 may also be referred to as, for example, 'access point (AP)', 'eNodeB (eNB)', '5th generation node (5G node)', 'next generation nodeB (gNB)', 'wireless point', transmission/reception point (TRP)' or other terms having an equivalent technical meaning. The base station 125 of an embodiment of the present disclosure may refer, for example, to a 5G gNB. However, in the base station 125, some eNB functions of 4G may be maintained due to a ProSe function.

According to various embodiments of the present disclosure, the base station 125 and the UE 110 may transmit and receive wireless signals in a mm Wave band (e.g., 28 GHZ, 30 GHz, 38 GHZ, and 60 GHZ). At this time, in order to improve a channel gain, the base station 125 and the UE 110 may perform beamforming. In the present disclosure, space-time coding may, for example, refer to a multi-antenna transmission method in which modulation symbols are mapped to time and space domains (transmission antennas) in order to obtain diversity by multiple transmission antennas. According to an embodiment of the present disclosure, a method and apparatus of the present disclosure may operate in emergency systems operating in a disaster situation. According to an embodiment, the emergency system may include a PS-LTE system. In the emergency system of an embodiment of the present disclosure, related entities may be capable of immediate group connection with the help of Internet protocol multimedia subsystem (IMS). As an example, the immediate group connection may be similar to terrestrial trunked radio (TETRA).

Figure 2B:
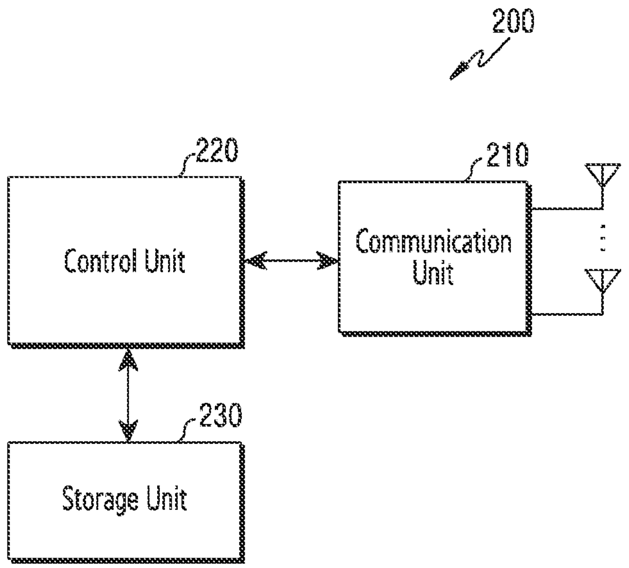
FIG. 2B illustrates a construction of an example core network entity in a wireless communication system according to various embodiments.

FIG. 2B illustrates a construction of an example core network entity in a wireless communication system according to various embodiments. A construction of a core network 200 illustrated in FIG. 2B may be understood as a construction of a device having at least one of the functions 150, 153, 155, 157, 160, 170, 180, and 190 of FIG. 1. A term such as '. . . unit', '. . . part', etc. used below refers, for example, to a unit that processes at least one function or operation, and this may be implemented as hardware, software, or a combination of hardware and software.

Referring to FIG. 2B, the core network entity includes a communication unit 210, a storage unit 230, and a control unit 220.

The communication unit 210 (including, e.g., communication circuitry) presents an interface for communicating with other devices in the network. That is, the communication unit 210 converts a bit stream transmitted from the core network entity to another device into a physical signal, and converts a physical signal received from another device into a bit stream. That is, the communication unit 210 may transmit and receive signals. Accordingly, the communication unit 210 may, for example, be referred to as a modem, a transmitter, a receiver, or a transceiver. At this time, the communication unit 210 enables the core network entity to communicate with other devices or systems via a backhaul connection (e.g., wired backhaul or wireless backhaul) or via a network.

The storage unit 230 (including, e.g., storage or memory) stores data such as basic programs for an operation of the core network entity, application programs, setting information, and the like. The storage unit 230 may, for example, include a volatile memory, a non-volatile memory, or a combination of volatile and non-volatile memories. Also, the storage unit 230 presents the stored data according to the request of the control unit 220.

The control unit 220 (including, e.g., control circuitry) controls overall operations of the core network entity. For example, the control unit 220 transmits and receives signals through the communication unit 210. Also, the control unit 220 writes data in the storage unit 230 and reads. To this end, the control unit 220 may include at least one processor. According to various embodiments of the present disclosure, the control unit 220 may control to perform synchronization using a wireless communication network. For example, the control unit 220 may control the core network entity to perform operations of various embodiments described below.

Figure 2C:
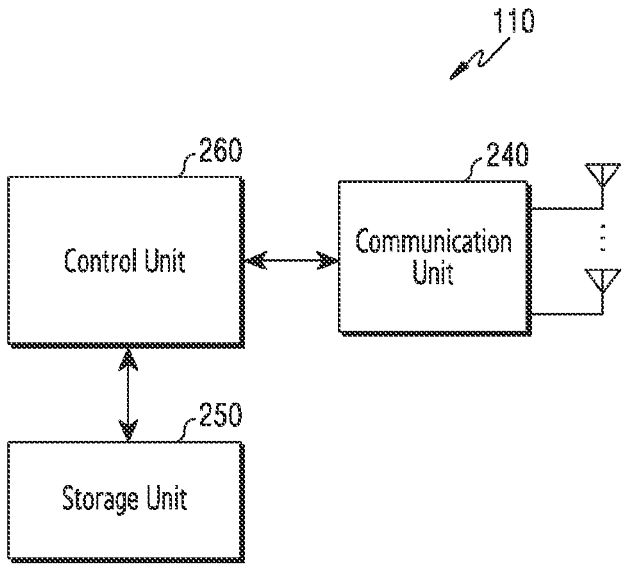
FIG. 2C illustrates a construction of an example UE in a wireless communication system according to various embodiments.

FIG. 2C illustrates a construction of an example UE in a wireless communication system according to various embodiments. The construction illustrated in FIG. 2C may be understood, for example, as a construction of the UE 110. According to an embodiment, the construction illustrated in FIG. 2C may be also understood as a construction of an EAP located and communicated between the base station 125 and the UE 110. A term such as '. . . unit' and '. . . part' used below may, for example, refer to a unit that processes at least one function or operation, and may be implemented as hardware, software, or a combination of hardware and software.

Referring to FIG. 2C, the UE (or EAP) includes a communication unit 240, a storage unit 250, and a control unit 260.

The communication unit 240 (including, e.g., communication circuitry) performs functions for transmitting and receiving signals through a wireless channel. For example, the communication unit 240 performs a conversion function between a baseband signal and a bit stream according to the physical layer standard of the system. For example, when transmitting data, the communication unit 240 provides complex symbols by encoding and modulating a transmission bit stream. Also, when receiving data, the communication unit 240 restores a reception bit stream by demodulating and decoding a baseband signal. Also, the communication unit 240 up-converts the baseband signal into an RF band signal, transmits the signal through an antenna, and down-converts an RF band signal received through the antenna into a baseband signal. For example, the communication unit 240 may include a transmit filter, a receive filter, an amplifier, a mixer, an oscillator, a DAC, an ADC, and the like.

Also, the communication unit 240 may include a plurality of transmission/reception paths. Furthermore, the communication unit 240 may include at least one antenna array including a plurality of antenna elements. In terms of a hardware side, the communication unit 240 may include a digital circuit and an analog circuit (e.g., a radio frequency integrated circuit (RFIC)). Here, the digital circuit and the analog circuit may be implemented in one package. Also, the communication unit 240 may include a plurality of RF chains. Furthermore, the communication unit 240 may perform beamforming.

The communication unit 240 transmits and receives signals as described above. Accordingly, all or part of the communication unit 240 may be referred to, for example, as 'transmitter', 'receiver', or 'transceiver'. Also, in the following description, transmission and reception performed through a wireless channel are used to refer to the above-described processing as being performed by the communication unit 240.

The storage unit 250 (including, e.g., storage or memory) stores data such as basic programs for an operation of the UE, application programs, and setting information. The storage unit 250 may include a volatile memory, a non-volatile memory, or a combination of volatile and non-volatile memories. The storage unit 250 presents the stored data according to the request of the control unit 260.

The control unit 260 (including, e.g., control circuitry) controls overall operations of the UE. For example, the control unit 260 transmits and receives signals through the communication unit 240. Also, the control unit 260 writes data in the storage unit 250 and reads. Also, the control unit 260 may perform protocol stack functions required by communication standards. To this end, the control unit 260 may include at least one processor or microprocessor, or may be a part of the processor. Also, a part of the communication unit 240 and the control unit 260 may be referred to, for example, as a communication processor (CP). According to various embodiments, the control unit 260 may control to perform synchronization using a wireless communication network. For example, the control unit 260 may control the UE to perform operations according to various embodiments described below.

Although not shown in FIG. 2C, the EAP may further include a communication unit performing the same role as a backhaul communication unit of the base station 125. The EAP may transmit and receive signals by establishing an X2 interface with another EAP or base station (gNB or eNB) through the communication unit performing the same role as the backhaul communication unit.

A term for identifying a connection node used in the following description, a term referring to network entities, a term referring to messages, a term referring to an interface between network entities, a term referring to various types of identification information, etc. are illustrated for convenience of description. Accordingly, the present disclosure is not limited to the terms described below, and other terms referring to an object having an equivalent technical meaning may be used.

In specifically describing example embodiments of the present disclosure, new radio (NR) that is a radio access network on the 5G mobile communication standard specified by 3GPP that is a mobile communication standard standardization organization, and a packet core (5G system, 5G core network, or next generation core (NG core)) that is a core network are a main target, but the main gist of the present disclosure is applicable with slight modifications to other communication systems having similar technical backgrounds without significantly departing from the scope of the present disclosure, and this will be possible with the judgment of a person having a technological knowledge and skilled in the technical field of the present disclosure.

A unit node that performs each function presented by the 5G network system may be defined as an NF (e.g., NF entity or NF node). Each NF may include at least one of an access and mobility management function (AMF) that manages access and mobility for an access network (AN) of UE, a session management function (SMF) that performs session-related management, a user plane function (UPF) that manages a user data plane, and a network slice selection function (NSSF) that selects a network slice instance available by the UE.

Figure 3:
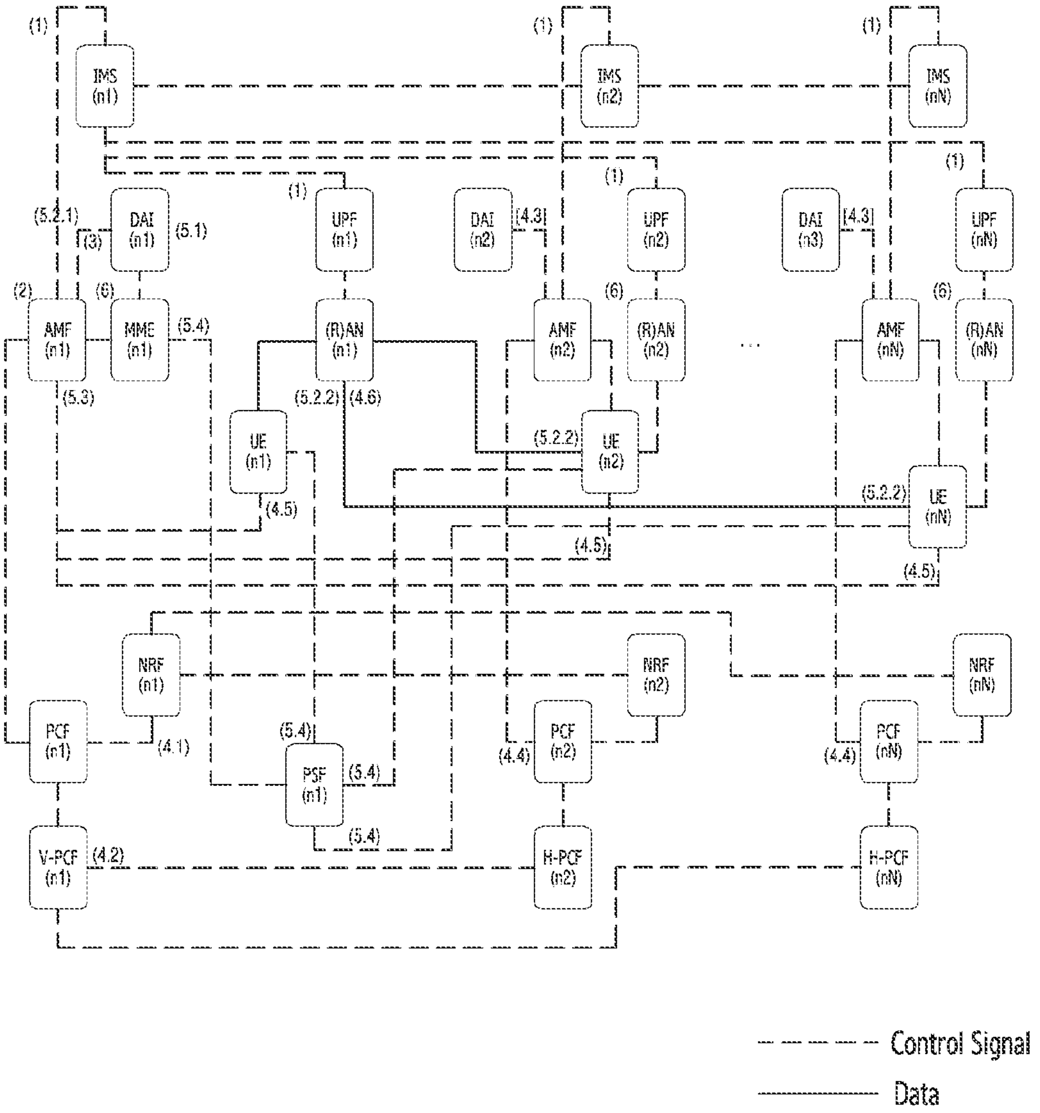
FIG. 3 illustrates a network structure in a state in which a communication group performing cooperative transmission is established in a wireless communication system according to various embodiments.

FIG. 3 illustrates an example network structure in a state in which a communication group performing cooperative transmission is established in a wireless communication system according to various embodiments.

Referring to FIG. 3, AMF, NRF, RAN, PCF, UPF and the like may refer, for example, to entities included in a core of a network. Also, the core may further include a mobility management entity (MME) and a proximity services function (PSF). According to an embodiment, a first UE, a second UE, and a third UE may, for example, refer to a UE connected to different networks such as a first network, a second network, and a third network.

In step 1, the first UE, the second UE, and the third UE belonging to the different networks may perform a conference call through IMS. The first network, the second network, and the third network may refer, for example, to overlapping networks. For convenience of description, three overlapping networks are shown, but the present disclosure is not limited thereto. A first IMS may notify a call from the first UE to a first AMF. Also, the first IMS may notify the call of a first UPF, a second UPF, and a third UPF. The conference call through the IMS may be conducted according to known methods. The conference call of an embodiment may be converted to cooperative transmission.

In step 2, the first AMF (originating AMF) may perform asynchronous or synchronization initiation of communication groups performing cooperative transmission. The asynchronous or synchronization initiation may refer, for example, to different networks providing a communication group that performs cooperative transmission by itself or by using communication between distributed artificial intelligence (DAI) modules. A core of an embodiment may include a plurality of AMFs but, for convenience of explanation, it may be assumed that each network includes one AMF.

In step 3, the first AMF may call a first DAI entity. In the present disclosure, distributed artificial intelligence (DAI) may refer, for example, to a module used to perform cooperative transmission and cooperative coding. According to an embodiment, the distributed artificial intelligence may be instantiated, and the distributed artificial intelligence may be called to operate only when the network performs operations specified in the present disclosure. According to an embodiment, the distributed artificial intelligence may be implemented as an independent entity. Also, according to an embodiment, the distributed artificial intelligence may be also part of an AMF. A function performed by a distributed artificial intelligence entity of various embodiments of the present disclosure may be called by each AMF orchestrating functionality (AMF coordinating function) proposed in the present disclosure. Due to the decentralized characteristics of the distributed artificial intelligence, multiple cooperative transmission coordinated by each of the overlapping networks may be coordinated, and communication between different distributed artificial intelligences may be performed.

In step 4.1, the first AMF may acquire PCF IDs (e.g., PCF identification information) for the second UE and the third UE, which are remote UEs, through NRF to NRF communication.

In step 4.2, the first AMF may instantiate a V-PCF and one or more H-PCFs. According to a 3GPP access scheme, in terms of a UE, a PCF of a network visited by the UE may refer, for example, to the V-PCF, and a PCF of a network (e.g., home network) to which the UE was originally connected may refer, for example, to an H-PCF. As an example, when a first network is an initiation network, a first PCF belonging to the first network may refer, for example, to the V-PCF, and a second PCF and a third PCF may refer, for example, to the H-PCFs. Or, the first PCF may include the V-PCF, and the second PCF and the third PCF may include the H-PCFs. Or, it may refer to the first PCF belonging to the first network being instantiated as the V-PCF, or it refer to the second PCF and the third PCF included in networks but not the initiation network being instantiated as the H-PCFs. The H-PCFs may, for example, refer to all PCFs presenting services to remote UEs (second UE and third UE), and when roaming to another network is attempted, the PCFs may become the H-PCFs.

In step 4.3, the first AMF instantiates a connection with a second DAI entity and a third DAI entity that are DAIs attached to the second AMF and the third AMF, which are AMFs serving the second UE and the third UE that are remote UEs. As described above, the function performed by the distributed artificial intelligence entity may be called by the coordination function of each AMF proposed in the present disclosure.

In step 4.4, the first AMF may confirm an intention to participate in the communication group from the second UE and the third UE that are the remote UEs. The intention to participate in the communication group of each UE may be changed. According to an embodiment, since the first AMF has acquired PCF IDs for the second UE and the third UE that are the remote UEs, the first AMF may use a control channel related to the PCF ID. The H-PCF may deliver, to the UE, request information of confirming an intention of the first AMF to participate in the communication group. Also, the H-PCF may acquire a confirmation of participation or participation intention related information and request from the second UE and the third UE, and deliver the acquired information back to the first AMF.

In step 4.5, the first AMF may connect the second UE and the third UE being the remote UEs to the first AMF, to form logical cooperative communication groups.

In step 4.6, the first AMF of an embodiment of the present disclosure may connect the second UE and the third UE being the remote UEs to the first RAN, to instantiate physical cooperative communication groups.

The logical cooperative communication group may refer, for example, to a state of forming a communication group in a core network step, and making control communication possible. Also, the physical cooperative communication group may refer, for example, to a state of forming a communication group for a RAN step, and making data communication possible. Also, in the aforementioned step, a physical connection step formed for RANs may occur simultaneously in several networks, and may be coordinated by distributed artificial intelligence (DAI) entities. Through the above steps, the first AMF may establish a communication group.

In step 5.1, a first DAI entity may select a code matrix. The code matrix may include a space-time block code matrix (e.g., code matrix Cx). According to an embodiment, the selection of the space-time block code matrix may be performed in an initial round when a communication group is formed, and may not need to be performed every time. According to an embodiment, each matrix code may include several columns to be allocated to indicate a modulation scheme for each UE. According to an embodiment, the first DAI entity may allocate each column of a code matrix to each UE, based on radio channel parameters between UEs forming a communication group and UEs serviced by the communication group.

In step 5.2.1, the first DAI entity may present information on UE most suitable for a column of each code matrix. According to an embodiment, a request of the information on the most suitable UE may be performed in an initial round when a communication group is formed, and may not need to be performed every time. As DAI's artificial intelligence continues to learn, its ability to find suitable UE may be improved.

In step 5.3, information allocated to a column of each code matrix may be delivered to each UE through a physical connection established with a first RAN. The allocated information may, for example, refer to information on a method in which each UE performs signal modulation in order to meet the requirements of a selected or given space-time code. According to an embodiment, the size of a code matrix (Cx) may be expanded or reduced based on an instruction of a first DAI entity. By the expansion or reduction of the code matrix size, dynamic switching between different codes may be allowed. That is, dynamic switching between matrices G2, G3 and G4 having a different number of columns may be allowed, or may be switched to non-orthogonal design or quasi-orthogonal designs tending to have larger matrices.

In step 5.4, cooperative transmission may be integrated with a device to device (D2D) function through an MME and a prose function (PSF), for the purpose of proper uplink and downlink transmission. Therefore, it may be linked with a PS-LTE technology. UEs in a communication group performing the cooperative transmission may be a kind of extension of gNB. When a gNB serves a specific remote UE to which data cannot be generally transmitted, it is necessary to check whether all the UE in the communication group transmit data in downlink rather than uplink. Similarly, when a signal is transmitted from remote UE to gNB through a communication group, data transmission must be performed in uplink rather than downlink.

In step 6, the first AMF may automatically update the above operations according to the instruction of the first DAI entity. Also, all AMFs included in each network may also automatically update the above-described operations.

As described above, referring to FIG. 3, functional operations of a core network for communication with remote UE through a network structure in which a communication group performing cooperative transmission is established are disclosed. Hereinafter, it goes without saying that organic operations with the core network described above may be applied to embodiments for supporting an EAP according to various embodiments of the present disclosure.

Figure 4:
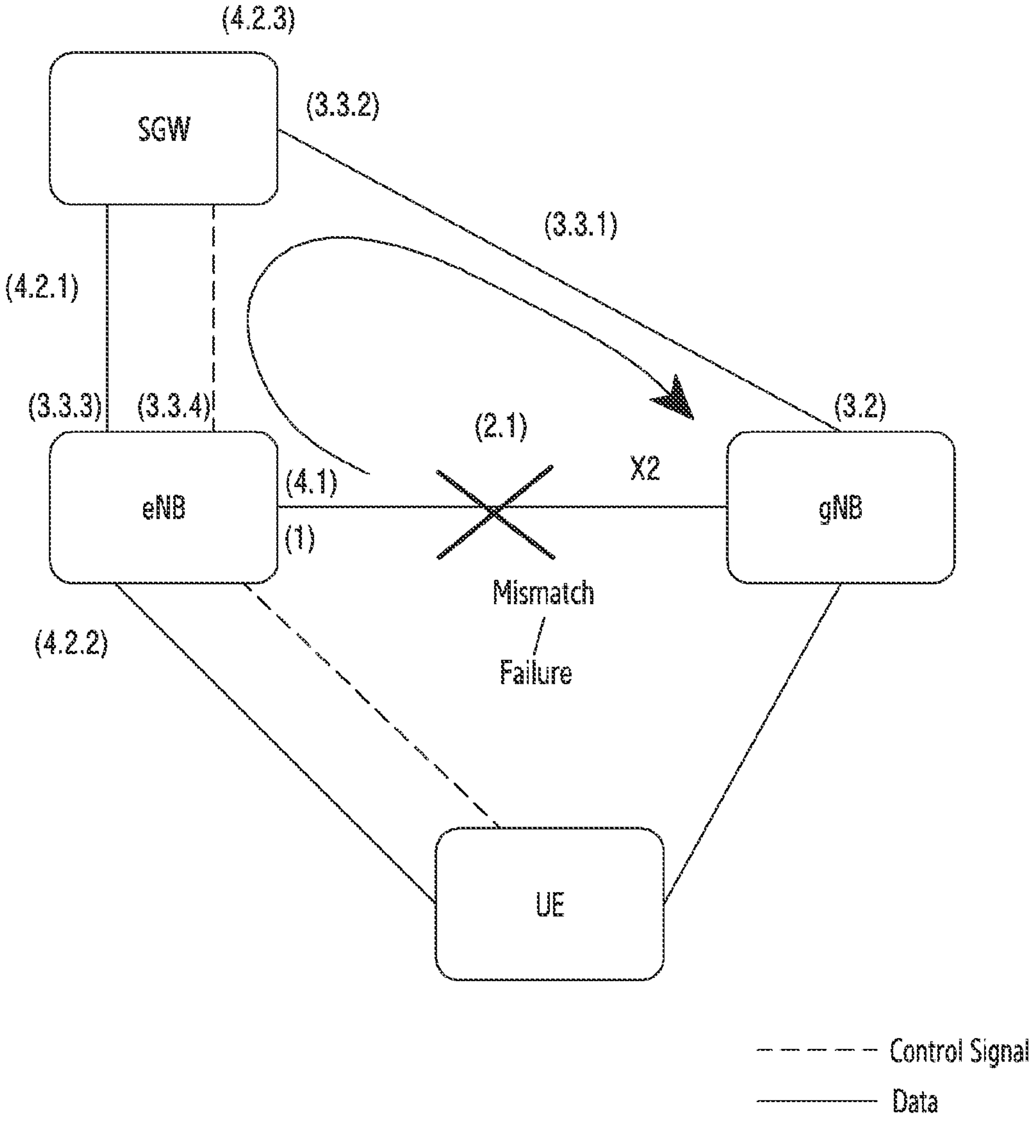
FIG. 4 illustrates a network structure including an example core network for connection between eNB and gNB in a wireless communication system according to various embodiments.

FIG. 4 illustrates an example network structure including a core network for connection between eNB and gNB in a wireless communication system according to various embodiments.

Referring to FIG. 4, UE may be connected to the eNB that is an LTE base station and the gNB that is a 5G base station, respectively. The eNB and the gNB may be connected to a serving gateway (SGW) that is a core network entity of LTE. According to an embodiment, the SGW may perform an anchor role in a case of call setup management, packet data delivery, IP mobility management, or handover. FIG. 4 illustrates, as a type of NSA scheme, a case in which the connection between the eNB and the gNB is deactivated, when there is a connection structure through an evolved packet core (EPC) that is an LTE core network, by simultaneously using an LTE network and a 5G NR network.

In step 1, the eNB may connect with the gNB under an option 3x mode. A 5G NSA option 3x mode may include a procedure in which traffic is split into LTE and 5G in a 5G cell, and the eNB and the gNB may be connected through an X2 interface, and the EPC (e.g., SGW) and the eNB may be connected through an S1 interface, and the EPC (e.g., SGW) and the gNB may be connected through an S1-U interface.

In step 2.1, when the eNB cannot identify the gNB due to connection failure or mismatch, the eNB may temporarily deactivate the X2 interface connected to the gNB.

In step 2.2, the eNB may notify the SGW about the connection failure or mismatch.

In step 3.1, the SGW may identify the connection failure or mismatch between the eNB and the gNB. According to an embodiment, the SGW may change a connection state to an option 3a mode, and initiate or instantiate a rollback for the changed option 3a mode. A 5G NSA Option 3a mode may include a procedure in which traffic is split into LTE and 5G in the SGW, and data radio bearer (DRB) splitting is not performed unlike the option 3x mode, so traffic may be delivered to the UE by using only either LTE or NR.

In step 3.2, the SGW may notify the gNB that setting has been changed and that the changed setting should be included in a split-bearer task.

In step 3.3.1, the SGW may instantiate load sharing on the SGW. According to an embodiment, the SGW may establish an S1 bearer with the gNB, and monitor a load/coverage situation of the gNB.

In step 3.3.2, when the load/coverage situation of the gNB occurs due to the connection failure or mismatch of the X2 interface, the SGW may buffer (e.g., temporarily store) a relevant part of traffic that needs to be transmitted until the above-mentioned problem is resolved and restored.

In step 3.3.3, the SGW may establish an S1 bearer with the eNB, and may transmit part of the buffered traffic through the eNB.

In step 3.3.4, the SGW may monitor the load/coverage situation of the eNB and, when a traffic bottleneck occurs, the SGW may reset a transmission path of the traffic.

In step 4.1, the eNB may attempt to re-establish the X2 interface with the gNB again. When the X2 interface between the eNB and the gNB is re-established, the 5G NSA option 3x mode may be applied.

In step 4.2.1, when the re-establishment of the X2 interface fails, the distributed load sharing of the changed option 3a mode may be executed. According to an embodiment, a bi-directional flow control communication between the eNG and the SGW may be established.

In step 4.2.2, when there is a time constraint that the traffic must be transmitted, the traffic may be modified or changed directly at the eNB during transmission.

In step 4.2.3, when there is no time constraint that the traffic must be transmitted, the traffic may be modified or changed at the SGW.

As described above, referring to FIG. 4, functional operations for controlling or transmitting/receiving the traffic when the connection between the eNB and the gNB fails in 5G NSA are disclosed. Hereinafter, it goes without saying that the organic operations with the core network and the base station described above may be applied to embodiments for supporting an EAP according to various embodiments of the present disclosure.

Figure 5:
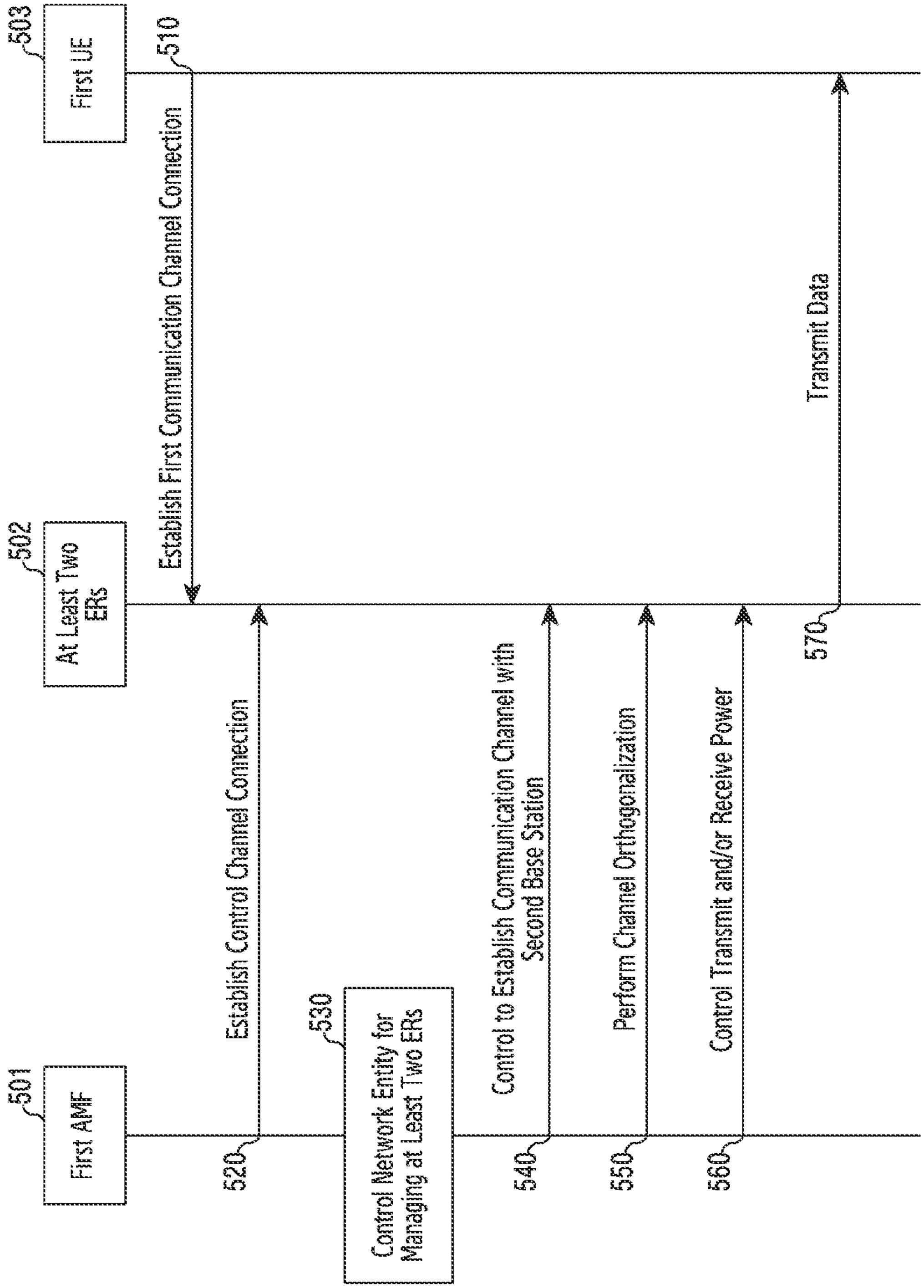
FIG. 5 is a diagram for explaining example operations between a first AMF, at least two ERs, and a first UE according to various embodiments.

FIG. 5 is a diagram for explaining example operations between a first AMF, at least two ERs, and a first UE according to an embodiment.

Referring to FIG. 5, a communication network of an embodiment may include the first AMF 501, the at least two ERs 502, and the first UE 503.

According to an embodiment, the first AMF 501 may correspond to the AMF 150 of FIG. 1. For example, the first AMF 501 may manage a first base station (e.g., the base station 125 of FIG. 2). In an embodiment, the first AMF 501 may be referred to, for example, as a virtualized network entity or a virtualized network element.

According to an embodiment, the at least two ERs 502 may correspond to a relay node (RN) that is, for example, a wireless network node. For example, each of the at least two ERs 502 may correspond to a relay node that connects or relays communication between the first base station managed by the first AMF 501 and the UE.

According to an embodiment, the at least two ERs 502 may perform a function of relaying data and/or a control signal between the first base station and the UE. The at least two ERs 502 may reduce a loss of data blocks transmitted to the UE, and ensure a transmission quality of data. For example, the at least two ERs 520 may relay the transmission of data and/or a control signal between the first base station and the first UE 503.

According to an embodiment, the first UE 503 may be located in a first cell of the first base station managed by the first AMF 501. For example, the first base station may expand coverage capable of communication connection with the first base station using the at least two ERs 502 communicatively connected to the first base station. For example, the first cell may be understood as a concept including up to coverage expanded by the at least two ERs 502.

According to an embodiment, the coverage capable of communication connection with the first base station may be referred to, for example, as the first cell, and the first UE 503 may be located in the first cell. In an embodiment, the first UE 503 may correspond to the UE 110 (e.g., 5G UE) of FIG. 2A. As a result, the first UE 503 may establish a communication connection with the first base station through the at least two ERs 502.

In the present disclosure, a cell of a base station (e.g., the base station 215 of FIG. 2A) may be referred to, for example, as a service area in which the base station or the ER connected to the base station may control radio resources. As another example, the cell of the base station may be referred to, for example, as an area in which the base station supports wireless communication. For example, the cell may correspond to an abstract space that is determined based on not only a physical space but also a frequency band in which wireless communication is performed and/or the wireless communication environment (e.g., interference, and disturbance caused by physical obstacles).

According to an embodiment, in operation 510, the first UE 503 may establish a first communication channel connection (or first communication connection) with the at least two ERs 502. The first UE 503 having established a communication connection with the first base station may be located within the first cell of the base station.

According to an embodiment, the first AMF 501 may establish a control channel connection for controlling the at least two ERs 502 in operation 520. For example, the first AMF 501 may establish a control channel connection with the at least two ERs 502 through the first base station managed by the first AMF 501. In an example, the first AMF 501 may transmit a control signal for controlling the at least two ERs 502 through the established control channel, and may receive a response to the control signal from the at least two ERs 502.

In the present disclosure, it has been described that the establishment of the control channel between the first AMF 501 and the at least two ERs 502 is performed through the first base station, but this is only an example. In an embodiment, the first AMF 501 may establish a direct control channel with the at least two ERs 502. In an example, the first AMF 510 may transmit a control signal directly to the at least two ERs 502 using the established control channel.

According to an embodiment, the operation of establishing the control channel connection between the first AMF 501 and the at least two ERs 502 in operation 520 may be substantially referred to, for example, as an expansion or relaxation of a control plane. For example, establishing the control channel from the first AMF 501 beyond the first base station to the at least two ERs 502 connected to the first base station may be substantially referred to, for example, as the expansion of the control plane.

According to an embodiment, as the first AMF 501 establishes the control channel connection with the at least two ERs 502 through the first base station, the first AMF 501 may control a communication connection between the at least two ERs 502 and the base station. For example, an operation in which the first AMF 501 controls the at least two ERs 502 to establish a communication channel with a second base station in operation 540 to be described later may be possible because the control plane between the first AMF 501 and the at least two ERs 502 is expanded.

According to an embodiment, in operation 530, the first AMF 501 may control a network entity for managing the at least two ERs 502. For example, the first AMF 501 may select the at least two ERs 502, and initiate or invoke a network entity for instructing the selected at least two ERs 502. For example, the network entity for managing the at least two ERs 502 may be a virtualized network entity (e.g., a virtual set function).

According to an embodiment, after the first AMF 501 invokes a network entity for managing the at least two ERs 502, in a case that a specified condition is satisfied, the first AMF 501 may control a network entity for managing the at least two ERs 502 to be connected to a second AMF. For example, the specified condition may be a condition in which the second base station newly connected to the at least two ERs 502 is managed by the second AMF.

For example, the first AMF 501 may control the at least two ERs 502 to establish a communication channel with the second base station, and the second base station may be managed by a second AMF distinct from the first AMF 501. In this case, the first AMF 501 may connect a network entity for managing the at least two ERs 502 to the second AMF after operation 530. The connecting of the network entity to the second AMF will be described in detail with reference to FIG. 8 below.

According to an embodiment, the first AMF 501 may maintain the network entity for managing the at least two ERs 502 continuously connected to the first AMF 501, in a case that the specified condition is not satisfied. The connecting of the network entity to the first AMF will be described in detail with reference to FIG. 7 below.

According to an embodiment, in operation 540, the first AMF 501 may control the at least two ERs 502 to establish a communication channel with the second base station. For example, the first AMF 501 may identify an overload in the first cell of the first base station or a malfunction of the first base station. In a case that the overload and/or malfunction are identified, the first AMF 501 may control the at least two ERs 502 to establish the communication channel with the second base station. In an example, an operation in which the first AMF 501 controls the at least two ERs 502 may be performed in a scheme of transmitting a control signal through a control channel.

According to an embodiment, the at least two ERs 502 may receive a control signal requesting the establishment of a communication channel with the second base station, a control message, or control information from the first AMF 501. In response to receiving the control signal, the at least two ERs 502 may establish a communication channel with the second base station. In an embodiment, the communication channel between the at least two ERs 502 and the second base station may be a communication channel for transmitting and/or receiving data.

According to an embodiment, the at least two ERs 502 establishing the communication channel with the second base station may release the communication channel with the first base station managed by the first AMF 501. However, this is only an example, and the at least two ERs 502 may maintain the communication channel with the first base station even after establishing the communication channel with the second base station.

According to an embodiment, even in a case that the at least two ERs 502 release the communication channel with the first base station, the at least two ERs 502 may maintain a control channel connection to the first AMF 601 through an expanded control plane (e.g., X2 interface). For example, even in a case that the communication channel with the first base station is released, the at least two ERs 502 may receive a control signal from the first AMF 601 through a control channel of the first base station. That is, the at least two ERs 502 may be connected to the first base station through the control channel, and be simultaneously connected to the second base station through the communication channel.

According to an embodiment, the control channel may refer, for example, to a wireless communication channel for transmitting a control signal and receiving a response of the control signal, and the communication channel may refer, for example, to a wireless communication channel for transmitting and/or receiving data.

According to an embodiment, the second base station may be a base station managed by the first AMF 501, or may be a base station managed by a second AMF distinct from the first AMF 501.

According to an embodiment, even in a case that the second base station is a base station managed by the first AMF 501, the at least two ERs 502 may still be included in a network including the first AMF 501. For example, even in a case that the at least two ERs 502 are connected to the second base station, the at least two ERs 502 may still be included in a first network including the first AMF 501. That is, even in a case that the at least two ERs 502 are connected to the second base station of a second network, a public land mobile network (PLMN) including the at least two ERs 502 may not change.

However, in this case, the at least two ERs 502 may identify that the communicating second base station is included in the second network. For example, in a case that the at least two ERs 502 establish a communication connection with the second base station under the control of the first AMF 501, the at least two ERs 502 may acquire an ID of a PLMN of the second base station, and may identify that the second base station is included in the second network distinct from the first network.

According to an embodiment, the PLMN may correspond, for example, to an identification number for distinguishing authorization of a specified mobile communication network operator in a specified country. For example, the PLMN ID (or PLMN identification number) may be expressed with a country code and a network code.

According to an embodiment, in operation 550, the first AMF 501 may control the at least two ERs 502 to perform channel orthogonalization. For example, the first AMF 501 may transmit a control signal of instructing the at least two ERs 502 to perform the channel orthogonalization, through a control channel by using the first base station.

According to an embodiment, an operation in which the at least two ERs 502 perform the channel orthogonalization may be referred to, for example, as an operation of controlling the at least two ERs 502 to substantially transmit a signal to the first UE 503 by using substantially the same frequency band and substantially the same time resource. For example, in order for the at least two ERs 502 to perform cooperative transmission described in FIG. 3, the at least two ERs 502 may need to perform the channel orthogonalization.

According to an embodiment, the first AMF 501 may allocate each of the at least two ERs 502 a code matrix in order for the at least two ERs 502 to use the same frequency band and the same time resource. The code matrix may include a space-time block code (STBC) matrix. As another example, the code matrix may include a quasi-orthogonal code matrix, a non-orthogonal code matrix, and a space time trellis coding (STTC) matrix.

For example, a row component of a code matrix allocated to each of the at least two ERs 502 may be referred to, for example, as a time resource for signal transmission. A column component of the matrix may be referred to, for example, as each of the at least two ERs 502 transmitting a signal.

According to an embodiment, the at least two ERs 502 may each cooperatively receive data from the second base station, based on the allocated code matrix.

According to an embodiment, the first AMF 501 may identify a modulation scheme requested to the at least two ERs 502 in order to use the same frequency band and the same time resource in a case that the at least two ERs 502 transmit and/or receive data signals from the first UE 503. The first AMF 501 may request the at least two ERs 502 to perform data modulation by the identified modulation scheme.

According to an embodiment, in operation 560, the first AMF 501 may control transmit power and/or receive power of the at least two ERs 502. For example, the first AMF 501 may maximize or capitalize the receive power in a case that the at least two ERs 502 receive data from the second base station, and the transmit power in a case that they transmit data.

According to an embodiment, in order for the at least two ERs 502 to establish a communication connection with the second base station, relatively high transmit power and/or receive power may be required compared to when establishing a communication connection with the first base station. Accordingly, the first AMF 501 may control the at least two ERs 502 to maximize (or increase) the transmit power and/or receive power of the at least two ERs 502.

According to an embodiment, the at least two ERs 502 may transmit data to the first UE 503 in operation 570. For example, the at least two ERs 502 may receive data over a communication channel with the second base station, and transmit the received data to the first UE. In an embodiment, the at least two ERs 502 may perform cooperative transmission even when transmitting data to the first UE 503. For example, the at least two ERs 502 may transmit data to the first UE 503 by using the same time resource and the same frequency band, based on the allocated code matrix.

In FIG. 5 of the present disclosure, operations 540 to 570 are described as separate operations having a particular order, but this is only an example. In an embodiment, operations 540 to 560 may be performed simultaneously, and after operation 550 may be performed first, operations 540 and 560 may be performed.

The operation of the first AMF 501 of the present disclosure may be substantially understood as an operation of at least one processor or controller included in the first AMF 501. Accordingly, the operation of the first AMF 501 described in FIG. 1 to FIG. 13 of the present disclosure may be referred to as an operation of at least one processor or controller included in the first AMF 501.

The operation of the at least two ERs 502 of the present disclosure may also be understood as an operation of at least one processor or controller included in each of the at least two ERs 502. Accordingly, the operation of the at least two ERs 502 described in FIG. 1 to FIG. 13 of the present disclosure may be referred to as an operation of at least one processor or controller included in each of the at least two ERs 502.

An operation of the first UE 503 of the present disclosure may also be understood as an operation of at least one processor or controller included in the first UE 503. Accordingly, the operation of the first UE 503 described in FIG. 1 to FIG. 13 of the present disclosure may be referred to as an operation of at least one processor or controller.

Figure 6:
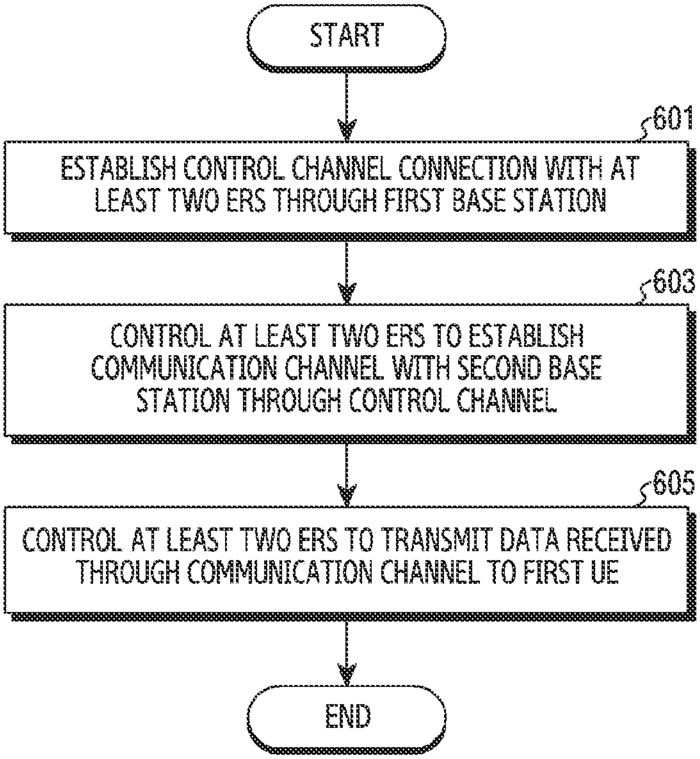
FIG. 6 is a diagram for illustrating an example operation of a first AMF according to various embodiments.

FIG. 6 is a diagram for illustrating an example operation of a first AMF according to various embodiments.

Referring to FIG. 6, in operation 601, a first AMF 501 of an embodiment may establish a control channel connection with at least two ERs 502 through a first base station. For example, the first AMF 501 may establish a control channel with the first base station, and transmit a control signal for controlling the first base station to the first base station. The first base station may establish a control channel with the at least two ERs 502 located within a cell of the first base station. As a result, the first AMF 501 may transmit a control signal to the at least two ERs 502 through the first base station.

According to an embodiment, the control channel between the first base station and the at least two ERs 502 may substantially correspond to an X2 interface.

According to an embodiment, in operation 603, the first AMF 501 may control the at least two ERs 502 to establish a communication channel with a second base station through the control channel. According to an embodiment, the at least two ERs 502 may receive a control signal of instructing to establish the communication channel with the second base station, from the first AMF 501.

According to an embodiment, the at least two ERs 502 may transmit and/or receive data from the second base station through the established communication channel. For example, the at least two ERs 502 may transmit and/or receive data from the second base station using the same time resource and the same frequency band, based on an STBC matrix.

According to an embodiment, in operation 605, the first AMF 501 may control the at least two ERs 502 to transmit the data received through the communication channel to first UE.

Figure 7:
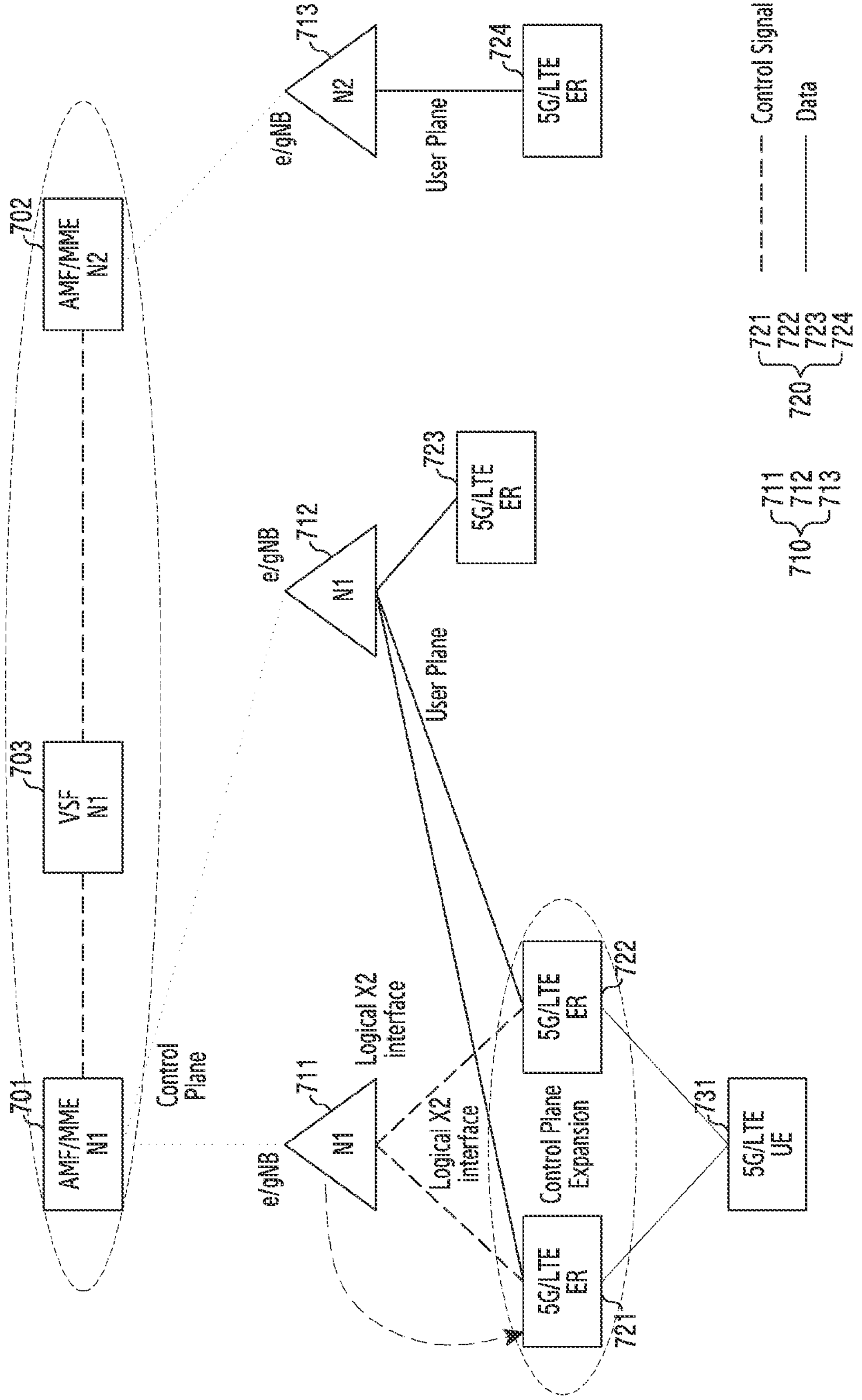
FIG. 7 is a diagram for illustrating an example network according to various embodiments.

FIG. 7 is a diagram for explaining an example network according to various embodiments.

Referring to FIG. 7, a network of an embodiment may include a first AMF 701, a second AMF 702, a virtual set function (VSF) 703, base stations 710, ERs 720, and/or first UE 731. In an embodiment, the first AMF 701 may correspond to the first AMF 501 of FIG. 5.

According to an embodiment, the base stations 710 may include a first base station 711, a second base station 712, and/or a third base station 713. In an embodiment, the first base station 711 and the second base station 712 may be managed by the first AMF 701. The third base station 713 may be managed by the second AMF 702. For example, the base stations 710 may correspond to eNodeB or gNodeB.

According to an embodiment, the first base station 711 and the second base station 712 managed by the first AMF 701 may be included substantially in the same PLMN. For example, the first base station 711 and the second base station 712 managed by the first AMF 701 may have substantially the same PLMN ID.

According to an embodiment, the first base station 711 and the third base station 713 may be included in different PLMNs. For example, the first base station 711 may have a different PLMN ID from the third base station 713 managed by the second AMF 702. For example, the first base station 711 and the second base station 712 may be included in a first PLMN, and may have a first PLMN ID. The third base station 713 may be included in a second PLNM, and may have a second PLMN ID.

According to an embodiment, the VSF 703 may include at least one virtualized network entity. For example, the VSF 703 may include an SMF (e.g., the SMF 160 of FIG. 1), a PCF (e.g., the PFC 190 of FIG. 1), and/or a UPF (e.g., the UPF 170 of FIG. 1).

According to an embodiment, the first AMF 701, the VSF 703 and the second AMF 702 may form a control plane. That is, a control signal may be transmitted between the first AMF 701, the VSF 703, and the second AMF 702.

According to an embodiment, the ERs 720 may include a first ER 721, a second ER 722, a third ER 723, and/or a fourth ER 724. In an embodiment, the third ER 723 may establish a communication connection with the second base station 712, and the third ER 723 may transmit or receive data from the second base station 712. In an embodiment, the fourth ER 724 may establish a communication connection with the third base station 713, and the fourth ER 724 may transmit or receive data from the third base station 713.

According to an embodiment, a plane between layers through which data is transmitted and/or received may be referred to as a user plane.

According to an embodiment, the ERs 720 may change a base station with which a communication connection is established. For example, the first ER 721 and the second ER 722 may establish a communication connection with the second base station 712 under the control of the first AMF 701 in a state in which a communication connection with the first base station 711 is established. That is, the at least two ERs 721 and 722 may change a communicatively connected base station from the first base station 711 to the second base station 712. In an embodiment, the at least two ERs 721 and 722 may correspond to the at least two ERs 502 of FIG. 5.

According to an embodiment, the first AMF 701 may extend a control plane. For example, the first AMF 701 may connect a control channel with the first base station 711. The first AMF 701 may establish a control channel with the first ER 721 and the second ER 722 beyond the first base station 711. As a result, the first AMF 701 may establish the control channel with the first ER 721 and the second ER 722 through the first base station 711.

According to an embodiment, a control channel between the first base station 711 and the at least two ERs 721 and 722 may substantially correspond to a logical X2 interface.

According to an embodiment, the at least two ERs 721 and 722 may establish a communication connection with the second base station 712, and may transmit data received from the second base station to the first UE 731. The first UE 731 may correspond to the first UE 503 of FIG. 5.

According to an embodiment, the first AMF 701 may control the at least two ERs 721 and 722 to transmit and/or receive data from the second base station 712 but not the first base station 711, thereby reducing a load in the first cell of the base station 711. Also, even in a case that there is a malfunction in the first base station 711, the network may continuously present a communication service to a user of the first UE 731.

According to an embodiment, the at least two ERs 721 and 722 change the base station with which the communication connection is established, from the first base station 711 to the second base station 712, but the first base station 711 and the second base station 712 may be all managed by the first AMF 701 and be included in substantially the same PLMN.

In FIG. 7 of the present disclosure, a change between the base stations included in substantially the same PLMN has been described, but this is only an example. Hereinafter, in FIG. 8, an example in which the at least two ERs 721 and 722 communicate with a base station included in a different PLMN from a previously connected base station is described.

Figure 8:
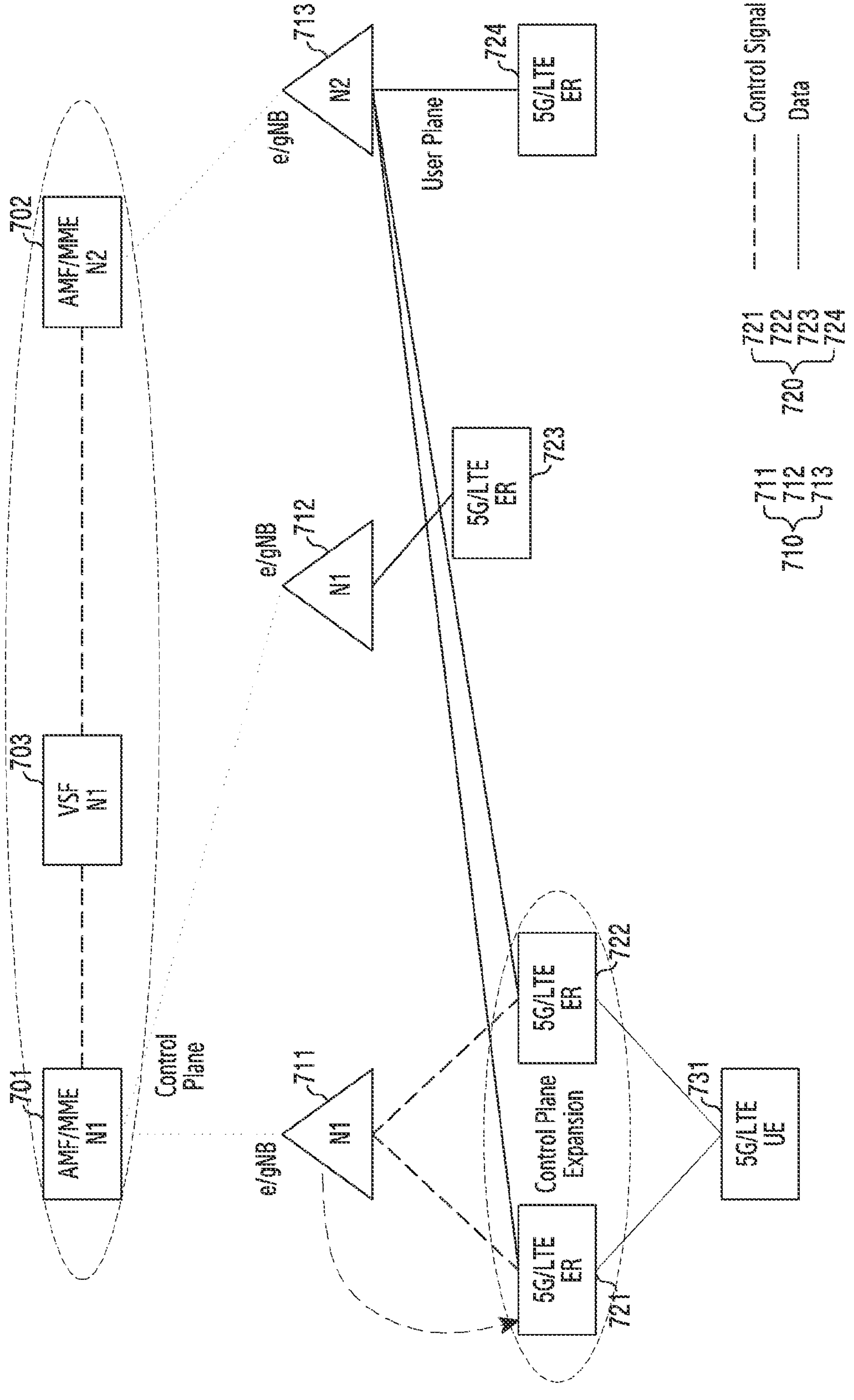
FIG. 8 is a diagram for illustrating a case in which a first UE changes a communication connection to a third base station of a second PLMN according to various embodiments.

FIG. 8 is a diagram for illustrating a case in which a first UE changes a communication connection to a third base station of a second PLMN according to various embodiments.

Referring to FIG. 8, a first AMF 701 of an embodiment may control at least two ERs 721 and 722 to establish a communication connection with a third base station 713. In an embodiment, the third base station 713 may be a base station managed by a second AMF 702 distinct from the first AMF 701. The third base station 713 may be included in a different PLMN from a first base station 711 and a second base station 712.

According to an embodiment, as the at least two ERs 721 and 722 are connected (or accessed) to the third base station 713, the first AMF 701 may connect a VSF 703 to a second AMF 702. For example, as the at least two ERs 721 and 722 are connected to the third base station 713 managed by the second AMF 702, the first AMF 701 may connect the VSF 703 to the second AMF 702. In an embodiment, the VSF 703 connected to the second AMF 702 may select and instruct the at least two ERs 721 and 722.

According to an embodiment, the at least two ERs 721 and 722 may identify a change of a PLMN. For example, the at least two ERs 721 and 722 may identify that a PLMN of a communicatively connected base station is changed from a first PLMN of the first base station 711 to a second PLMN of the third base station 713. However, even in this case, the at least two ERs 721 and 722 may still be included in the first PLMN.

In an embodiment, even if the at least two ERs 721 and 722 identify the change of the PLMN of the connected base station, a communication connection with the first UE 731 may be maintained. For example, the at least two ERs 721 and 722 may identify that the PLMN of the communicatively connected base station is changed from the first PLMN to the second PLMN. Even if the change to the second PLMN is identified, the at least two ERs 721 and 722 may still maintain a communication connection with the first UE 731 having the first PLNM ID, and transmit or receive data from the first UE 731. As a result, even if the newly communicatively connected base station has a different PLMN from the previously connected base station, the at least two ERs 721 and 722 may continuously present a communication service to the previously connected first UE 731. In addition, the at least two ERs 721 and 722 may also present the communication service to a new UE having the first PLMN after the PLMN change despite the PLMN change.

Figure 9:
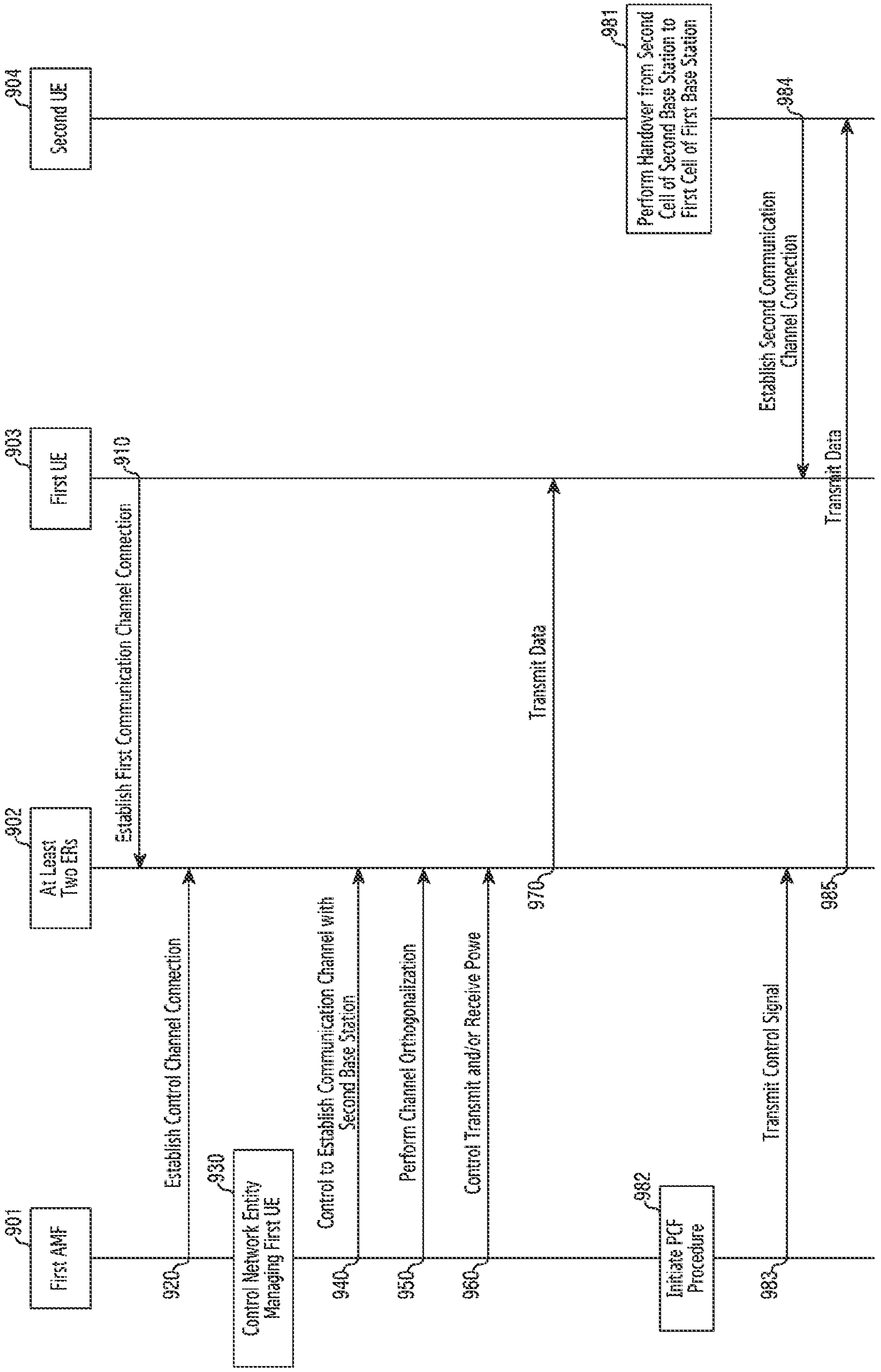
FIG. 9 is a diagram for illustrating example operations between a first AMF, at least two ERs, and a second UE according to various embodiments.

FIG. 9 is a diagram for explaining example operations between a first AMF, at least two ERs, and a second UE according to various embodiments.

Referring to FIG. 9, a communication network of an embodiment may include a first AMF 901, at least two ERs 902, a first UE 903, and/or a second UE 904. In an embodiment, the first AMF 901, the at least two ERs 902, and the first UE 903 may respectively correspond to the first AMF 501, the at least two ERs 502, and the first UE 503, respectively.

According to an embodiment, the second UE 904 may be distinguished from the first UE 903. The second UE 904 may, for example, be a UE located in a second cell of a second base station (e.g., the second base station 712 of FIG. 7) and entering (or moving) to a first cell of a first base station (e.g., the first base station 711 of FIG. 7).

Operation 910, operation 920, operation 930, operation 940, operation 950, operation 960, and operation 970 of FIG. 9 of the present disclosure may sequentially correspond to operation 510, operation 520, operation 530, operation 540, operation 550, operation 560, and operation 570 of FIG. 5.

According to an embodiment, in operation 981, the second UE 904 may perform handover from the second cell of the second base station to the first base station. The handover of the present disclosure may be referred to, for example, as a function in which, in a case that UE moves from a service space of a connected base station (e.g., a second base station) to a service space of another base station (e.g., a first base station), the UE tunes to a communication channel allocated to the service space of another base station (e.g., the first base station) and a service is connected.

For example, the second UE 904 may enter the first cell of the first base station from the second cell of the second base station according to a user's movement, and the second UE 904 may perform handover. For example, upon entering the first cell of the first base station, the second UE 904 may transmit a random access preamble to the first base station. The second UE 904 may receive a handover request message from the first base station, and transmit a response message to the handover request message to the first base station. The first base station may allocate radio resources to the second UE 904 in response to receiving the response message.

According to an embodiment, the second UE 904 may be included in a different PLMN from the first UE 903 and the first base station. For example, the second UE 904 may be included in a second network distinct from a first network. In order for the second UE 904 to access or connect to the first cell of the first base station included in another PLMN, a policy control function (PCF) procedure may be required.

According to an embodiment, in operation 982, the first AMF 901 may initiate the PCF procedure. For example, the first AMF 901 (or the first base station) may acquire a PCF identification (ID) of the second UE 904. The first base station may perform a communication connection with the second UE 904 included in another PLMN, based on the PCF ID. The PCF procedure will be described in detail in FIG. 10 and FIG. 11 below.

According to an embodiment, in operation 983, the first AMF 901 may transmit a control signal to the at least two ERs 902. For example, the first AMF 901 may control the at least two ERs 902 to establish a second communication connection with the second UE 904, based on the PCF procedure.

According to an embodiment, in operation 984, the second UE 904 and the at least two ERs 902 may establish a second communication channel connection. In an embodiment, a second communication channel may correspond to a wireless communication channel for transmitting and/or receiving data.

According to an embodiment, in operation 985, the at least two ERs 902 may transmit or receive data from the second UE 904. For example, the at least two ERs 902 may transmit data received from the second base station, to the second UE 904, and transmit data received from the second UE 904, to the second base station.

In the present disclosure, it is assumed that the second UE 904 performs handover after the at least two ERs 902 transmit data to the first UE 903 through a communication channel. However, this is only an example and the order of operations is not limited. For example, the handover of the second UE 904, the establishment of the second communication channel connection, and data transmission may be performed regardless of operations between the first UE 903 and the at least two ERs 920.

Figure 10:
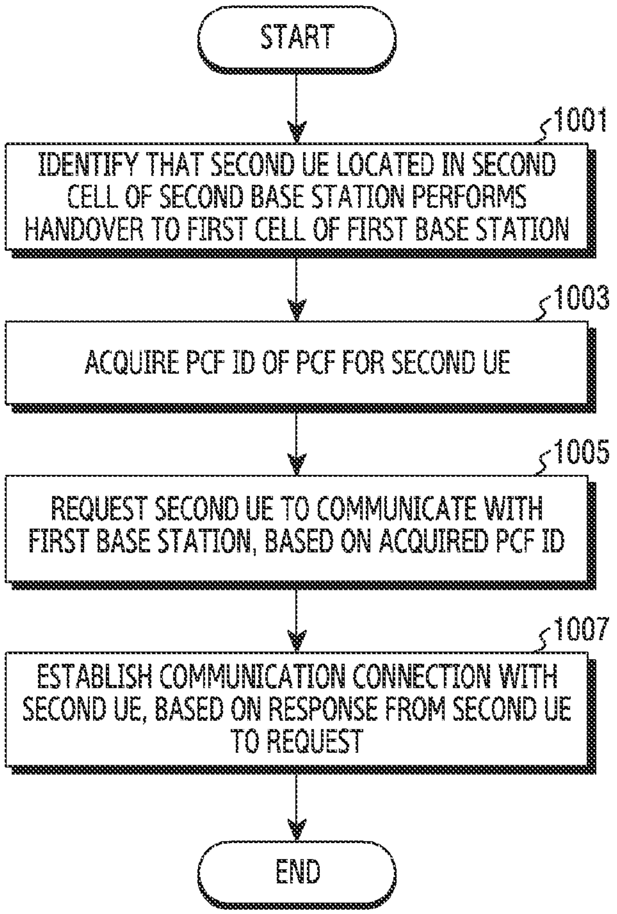
FIG. 10 is a diagram for illustrating an example operation in which a first AMF controls at least two ERs to establish a communication connection with a second UE performing handover according to various embodiments.

FIG. 10 is a diagram for illustrating an example operation in which a first AMF controls at least two ERs to establish a communication connection with a second UE that performs handover according to various embodiments.

Referring to FIG. 10, in operation 1001, a first AMF 901 of an embodiment may identify that a second UE 904 located in a second cell of a second base station performs handover to a first cell of a first base station.

According to an embodiment, in operation 1003, the first AMF 901 may acquire a PCF ID of a PCF for the second UE 904. For example, a network managed by the first AMF 901 may be referred to, for example, as a first network, and a network managed by a second AMF (e.g., the second AMF 702 of FIG. 7) may be referred to, for example, as a second network. In an example, the first AMF 901 may request the PCF ID to the second AMF. The PCF ID may be referred to, for example, as a PCF ID for the second UE included in the second network.

In an example, the second AMF may transmit the PCF ID to the first AMF 901 using a second policy control function (PCF) of the second network. Also, the second AMF may instantiate a home PCF necessary for the first AMF 901 to interact with the first network.

According to an embodiment, the first AMF 901 may instantiate the PCF ID of the second UE 904 in the first network managed by the first AMF 901, based on the received PCF ID of the second UE 904. For example, the first AMF 901 may instantiate the PCF of the second UE 904 as a visited PCF in the first network.

According to an embodiment, in operation 1005, the first AMF 901 may request the second UE 904 to communicate with the first base station, based on the acquired PCF ID. For example, the first AMF 901 may request the second UE 904 to communicate with the first base station through the visited PCF instantiated in the first network and the home PCF instantiated in the second network. That is, the first AMF 901 may request the second UE 904 to establish a communication connection with the first base station through the visited PCF and the home PCF.

According to an embodiment, in operation 1007, the first AMF 901 may establish a communication connection with the second UE 904, based on a response from the second UE 904 to the request. For example, the first AMF 901 may establish a second communication connection with the second UE 904, based on the response from the second UE 904.

As a result, the first AMF 901 may establish the communication connection between the first base station and the second UE 904, which are entities of different networks, based on the PCF ID for the second UE 904 received from the second AMF of the second network. That is, the first AMF 901 may establish the communication connection between the first base station and the second UE 904 included in different PLMNs, based on the PCF ID.

In the present disclosure, the communication connection between the first base station and the second UE 904 included in the different PLMNs has been mainly described, but this is for convenience of description. Therefore, the communication connection between the first base station and the second UE 904 may also be understood substantially as a communication connection between the at least two ERs 902 connected to the first base station, and the second UE 904.

Operations 1001 to 1005 of the present disclosure may substantially correspond to operation 982 of FIG. 9. However, a corresponding relationship between the operations is not limited thereto. Accordingly, the embodiment of FIG. 10 of the present disclosure may be combined with the embodiment of FIG. 9.

Figure 11:
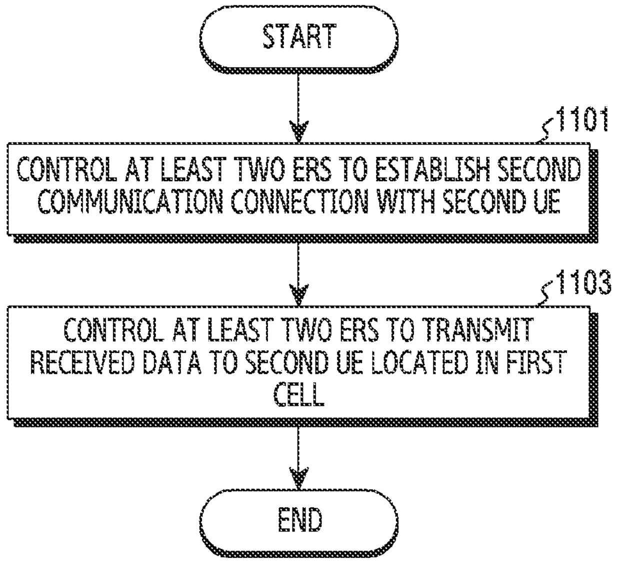
FIG. 11 is a diagram for illustrating example data transmission between at least two ERs and a second UE between which communication connections are established according to various embodiments.

FIG. 11 is a diagram for explaining example data transmission between at least two ERs and a second UE between which communication connections are established according to various embodiments.

Referring to FIG. 11, in operation 1101, a first AMF 901 of an embodiment may control at least two ERs 902 to establish a second communication connection with a second UE 904. For example, the first AMF 901 may transmit a control signal to the at least two ERs 902 through a first base station, and the at least two ERs 902 receiving the control signal may establish the second communication connection with the second UE 904. Operation 1101 of the present disclosure may correspond to operation 984 of FIG. 9. However, a corresponding relationship between the operations is not limited thereto.

According to an embodiment, the first AMF 901 may control the at least two ERs 902 to transmit received data to the second UE 904 located in a first cell in operation 1103. For example, the at least two ERs 902 may receive data from a second base station, and the at least two ERs 902 may transmit the received data to the second UE 904, based on the control of the first AMF 901. Operation 1103 of the present disclosure may correspond to operation 985 of FIG. 9. However, a corresponding relationship between the operations is not limited thereto.

Figure 12:
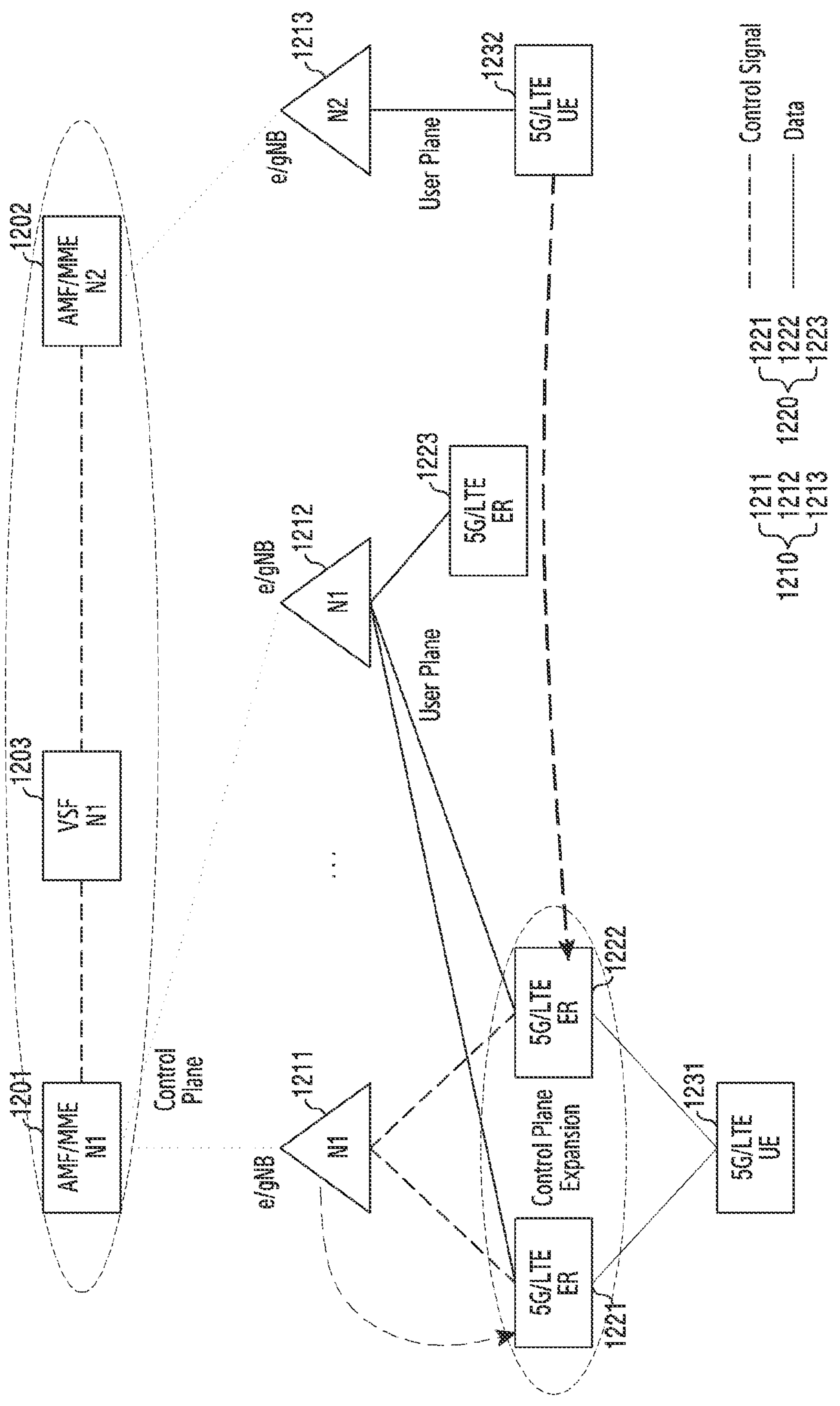
FIG. 12 is a diagram for illustrating an example network including at least two ERs according to various embodiments.

FIG. 12 is a diagram for explaining an example network including at least two ERs.

Referring to FIG. 12, the network of an embodiment may include a first AMF 1201, a second AMF 1202, a virtual set function (VSF) 1203, base stations 1210, ERs 1220, a first UE 1231, and/or a second UE 1232. In an embodiment, the first AMF 1201 may correspond to the first AMF 501 of FIG. 5 or the first AMF 901 of FIG. 9.

According to an embodiment, the base stations 1210 may include a first base station 1211, a second base station 1212, and/or a third base station 1213. In an embodiment, the first base station 1211 and the second base station 1212 may be managed by the first AMF 1201. The third base station 1213 may be managed by the second AMF 1202. For example, the base stations 1210 may correspond to eNodeB or gNodeB.

According to an embodiment, the first base station 1211 and the second base station 1212 managed by the first AMF 1201 may be included in substantially the same PLMN. For example, the first base station 1211 and the second base station 1212 may have substantially the same PLMN ID.

According to an embodiment, each of the first base station 1211 and the second base station 1212 managed by the first AMF 1201 may be included in a different PLMN from the third base station 1213. For example, the first base station 1211 may have a different PLMN ID from the third base station 1213 managed by the second AMF 1202. For example, the first base station 1211 and the second base station 1212 may be included in a first PLMN, and may have a first PLMN ID. The third base station 713 may be included in a second PLNM, and may have a second PLMN ID.

According to an embodiment, the VSF 1203 may include at least one virtualized network entity. For example, the VSF 1203 may include an SMF (e.g., the SMF 160 of FIG. 1), a PCF (e.g., the PFC 190 of FIG. 1), and/or a UPF (e.g., the UPF 170 of FIG. 1).

According to an embodiment, the first AMF 1201, the VSF 1203 and the second AMF 1202 may form a control plane. That is, control signals may be transmitted and/or received between the first AMF 1201, the VSF 1203, and the second AMF 1202.

According to an embodiment, the ERs 1220 may include a first ER 1221, a second ER 1222, and/or a third ER 1223. In an embodiment, the third ER 723 may establish a communication connection with the second base station 712, and the third ER 723 may transmit and/or receive data from the second base station 712.

According to an embodiment, a plane between layers through which data is transmitted and/or received may be referred to as a user plane. For example, data transmission and/or reception between the third ER 723 and the second base station 712 may correspond to the user plane.

According to an embodiment, the ERs 1220 may change a base station through which a communication connection is established. For example, the first ER 1221 and the second ER 1222 may establish a communication connection with the second base station 1212 under the control of the first AMF 1201 in a state in which a communication connection with the first base station 1211 is established. That is, the at least two ERs 1221 and 1222 may change a communicatively connected base station from the first base station 1211 to the second base station 1212. In an embodiment, the at least two ERs 1221 and 1222 may correspond to the at least two ERs 902 of FIG. 9.

In the present disclosure, it is described that the at least two ERs 1221 and 1222 release the communication connection with the first base station 1211 while establishing a new communication connection with the second base station 1212, but this is only an example. The at least two ERs 1221 and 1222 may maintain the communication connection with the existing first base station 1211 while establishing the new communication connection with the second base station 1212. The at least two ERs 1221 and 1222 may identify a channel quality index (e.g., RSSI or QoS) for each base station, and may transmit and/or receive data from a base station (e.g., the second base station 1212) having a relatively high channel quality index.

According to an embodiment, the first AMF 1201 may extend the control plane. For example, the first AMF 1201 may connect a control channel with the first base station 1211. The first AMF 1201 may establish a control channel with the first ER 1221 and the second ER 1222 beyond the first base station 1211. As a result, the first AMF 1201 may establish the control channel with the first ER 1221 and the second ER 1222 through the first base station 1211.

According to an embodiment, the control channel between the first base station 1211 and the at least two ERs 1221 and 1222 may substantially correspond to a logical X2 interface.

According to an embodiment, the at least two ERs 1221 and 1222 may establish a communication connection with the second base station 1212, and transmit data received from the second base station 1212, to the first UE 1231. The first UE 1231 may correspond to the first UE 903 of FIG. 9.

According to an embodiment, the first AMF 1201 may control the at least two ERs 1221 and 1222 to transmit and/or receive data from the second base station 1212 but not the first base station 1211, thereby reducing a load in a first cell of the first base station 1211. Also, even in a case that there is a malfunction in the first base station 1211, a network may continuously present a communication service to a user of the first UE 1231.

According to an embodiment, the second UE 1232 may establish a communication connection with the third base station 1213. The second UE 1232 may perform handover to the first cell of the first base station 1211. For example, the second UE 1232 included in a second network may perform handover to the first cell of the first base station 1211 included in a first network.

According to an embodiment, the PLMN (e.g., the first PLMN) including the first base station 1211 and the PLMN (e.g., the second PLMN) including the second UE 1232 may be different and accordingly, the PCF procedure described above in FIG. 12 to FIG. 13 may need to be performed in order for the second UE 1232 to access or connect to the second network.

For example, in order for the second UE 1232 to access the second network, the first AMF 1201 may acquire a PCF ID for the second UE 1232 through the second network, and the first AMF 1201 may establish a communication connection with the second UE 1232, based on the acquired PCF ID.

According to an embodiment, in a case that the second UE 1232 accesses or connects to the first network, the at least two ERs 1221 and 1222 may establish a communication connection with the second UE 1232. The communication connection between the at least two ERs 1221 and 1222 and the second UE 1232 may be performed under the control of the first AMF 1201 or the first base station 1211.

According to an embodiment, the at least two ERs 1221 and 1222 may transmit data received from the second base station 1212, to the second UE 1232, or transmit data received from the second UE 1232, to the second base station 1212. In FIG. 12 of the present disclosure, a change between base stations included in the same PLMN has been described, but this is only an example. Hereinafter, in FIG. 13, an example in which the at least two ERs 1221 and 1222 change a communication connection between base stations included in different PLMNs will be described.

Figure 13:
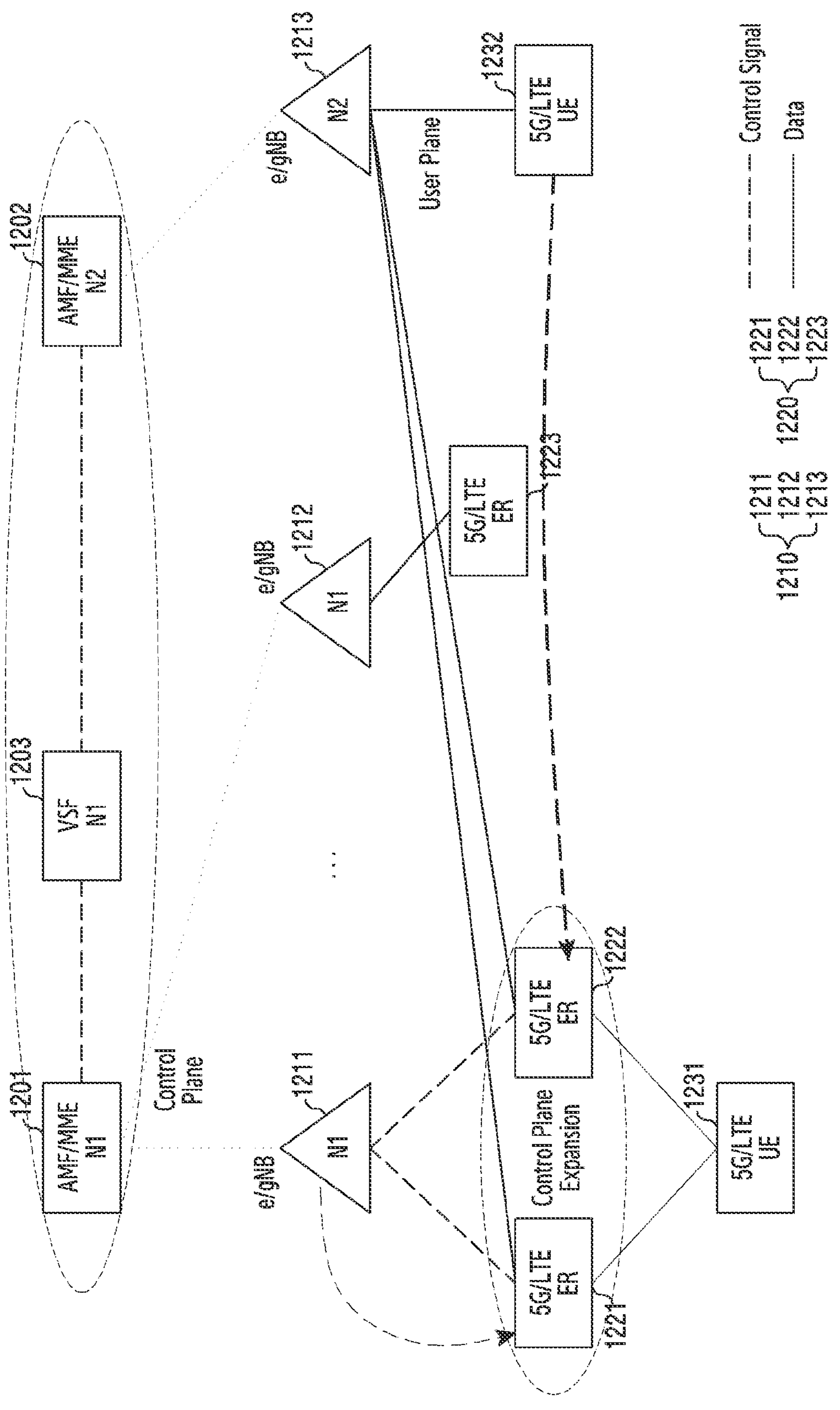
FIG. 13 is a diagram for illustrating an example network including at least two ERs according to various embodiments.

FIG. 13 is a diagram for explaining an example network including at least two ERs.

Referring to FIG. 13, a first AMF 1201 of an embodiment may control at least two ERs 1221 and 1222 to establish a communication connection with a third base station 1213. In an embodiment, the third base station 1213 may be a base station managed by a second AMF 1202 distinct from the first AMF 1201. The third base station 1213 may be included in a different PLMN from a first base station 1211 and a second base station 1212.

According to an embodiment, as the at least two ERs 1221 and 1222 are connected (or accessed) to the first base station 1211 and the third base station 1213 included in the PLMN, the first AMF 1201 may connect a VSF 1203 to the second AMF 1202. For example, as the at least two ERs 1221 and 1222 are connected to the third base station 1213 managed by the second AMF 1202, the first AMF 1201 may connect the VSF 1203 to the second AMF 1202. In an embodiment, the VSF 1203 connected to the second AMF 1202 may select and instruct the at least two ERs 1221 and 1222.

In an embodiment, even if the at least two ERs 1221 and 1222 identify a change of the PLMN of the connected base station, the communication connection with a first UE 1231 may be maintained. For example, the at least two ERs 1221 and 1222 may identify that the PLMN of the communicatively connected base station is changed from a first PLMN to a second PLMN. However, even if the change to the second PLMN is identified, the at least two ERs 1221 and 1222 may still maintain the communication connection with the first UE 1231 included in the first PLNM, and may transmit or receive data from the first UE 1231. As a result, even if a newly communicatively connected base station is included in a different PLMN from a previously connected base station, the at least two ERs 1221 and 1222 may continuously present communication services to the existing connected first UE 1231.

In addition, even though the PLMN of the connected base station is changed on a user plane, the at least two ERs 1221 and 1222 may also present communication services for new UE included in the first PLMN after the PLMN change.

According to an example embodiment, a method performed by a first access and mobility management function (AMF) in a wireless communication system may include establishing a control channel connection with at least two enhanced relays (ERs) through a first base station managed by the first AMF; controlling the at least two ERs to establish a communication channel with a second base station distinct from the first base station through the control channel; and controlling the at least two ERs to transmit data received through the communication channel to a first user equipment (UE).

According to an example embodiment, the at least two ERs may transmit the received data to the first UE using the same frequency band and the same time resource.

According to an example embodiment, each of the at least two ERs may be allocated a code matrix in order for the at least two ERs to use the same frequency band and the same time resource. The code matrix may be a space-time block code (STBC).

According to an example embodiment, the second base station may be managed by the first AMF. The second base station may be included in the same public land mobile network (PLMN) as the first base station.

According to an example embodiment, the second base station may be managed by a second AMF distinct from the first AMF. The second base station may be included in a different public land mobile network (PLMN) from the first base station.

According to an example embodiment, the method may further include identifying a network entity for managing the at least two ERs among a plurality of network entities, and controlling the identified network entity to be connected to the second AMF.

According to an example embodiment, the method may further include identifying that a second UE located in a second cell of the second base station performs handover to a first cell of the first base station, acquiring a PCF identification (ID) of a policy control function (PCF) for the second UE, requesting the second UE to communicate with the first base station, based on the acquired PCF ID, and establishing a communication connection with the second UE, based on a response from the second UE to the request. The second base station may be included in a different public land mobile network (PLMN) from the first base station.

According to a example embodiment, the method may further include instantiating the PCF of the second UE, based on the acquired PCF ID, and requesting the second UE to communicate with the first base station through the instantiated PCF.

According to an example embodiment, the method may include controlling the at least two ERs to establish a communication connection with the second UE, and controlling the at least two ERs to transmit the received data to the second UE located in the first cell.

According to an example embodiment, the method may include identifying a modulation scheme requested to the at least two ERs in order to use the same frequency band and the same time resource in a case that the at least two ERs transmit data to the first UE, and requesting the at least two ERs to perform data modulation by the identified modulation scheme.

According to an example embodiment, a server supporting a first access and mobility management function (AMF) in a wireless communication system may include a transceiver, and at least one processor coupled to the transceiver. The at least one processor may establish a control channel connection with at least two enhanced relays (ERs) through a first base station managed by the first AMF; control the at least two ERs to establish a communication channel with a second base station distinct from the first base station through the control channel; and control the at least two ERs to transmit data received through the communication channel, to a first user equipment (UE) that has established a first communication connection with the at least two ERs.

According to an example embodiment, the at least two ERs may transmit the received data to the first UE by using the same frequency band and the same time resource.

According to an example embodiment, each of the at least two ERs may be allocated a code matrix in order for the at least two ERs to use the same frequency band and the same time resource. The code matrix may be a space-time block code (STBC).

According to an example embodiment, the second base station may be managed by the first AMF. The second base station may be included in the same public land mobile network (PLNM) as the first base station.

According to an example embodiment, the second base station may be managed by a second AMF distinct from the first AMF. The second base station may be included in a different public land mobile network (PLMN) from the first base station.

According to an example embodiment, the at least one processor may identify a network entity for managing the at least two ERs among a plurality of network entities, and control the identified network entity to be connected to the second AMF.

According to an example embodiment, the at least one processor may identify that a second UE located in a second cell of the second base station performs handover to a first cell of the first base station, and acquire a PCF identification (ID) of a policy control function (PCF) for the second UE. The at least one processor may request the second UE to communicate with the first base station, based on the acquired PCF ID, and establish a communication connection with the second UE, based on a response from the second UE to the request. The second base station may be included in a different public land mobile network (PLMN) from the first base station.

According to an example embodiment, the at least one processor may instantiate the PCF of the second UE, based on the acquired PCF ID, and request to communicate with the first base station to the second UE through the instantiated PCF.

According to an example embodiment, the at least one processor may control the at least two ERs to establish a second communication connection with the second UE, and control the at least two ERs to transmit the received data to the second UE located in the first cell.

According to an example embodiment, the at least one processor may identify a modulation scheme requested to the at least two ERs in order to use the same frequency band and the same time resource in a case that the at least two ERs transmit data to the first UE, and may request the at least two ERs to perform data modulation by the identified modulation scheme.

While the disclosure has been illustrated and described with reference to various example embodiments, it will be understood that the various embodiments are intended to be illustrative, not limiting. It will be further understood by those skilled in the art that various changes in form and detail may be made without departing from the true spirit and full scope of the disclosure, including the appended claims and their equivalent. It will also be understood that any of the embodiment(s) described herein may be used in conjunction with any other embodiment(s) described herein.

What is claimed is:

1. A method performed by a first access and mobility management function (AMF) entity in a wireless communication system, the method comprising:

establishing a control channel with at least two enhanced relays (ERs) via a first base station managed by the first AMF entity;

transmitting, to the at least two ERs via the control channel, a first control message for requesting to establish a communication channel with a second base station managed by a second AMF entity;

controlling a network entity to access the second AMF entity based on the communication channel being established, wherein the network entity is for delivering control messages between the first AMF entity and the second AMF entity; and controlling the network entity to transmit a second control message to the at least two ERs, via the second AMF entity and the second base station, wherein the second control message indicates to transmit, to a first user equipment (UE), data received from the communication channel.

2. The method of claim 1, wherein the at least two ERs transmit the data to the first UE using a same frequency band and a same time resource.

3. The method of claim 1, wherein each of the at least two ERs is allocated a code matrix in order for the at least two ERs to use a same frequency band and a same time resource, and wherein the code matrix is a space-time block code (STBC).

4. The method of claim 1, wherein a public land mobile network (PLMN) of the second base station is different from a PLMN of the first base station.

5. The method of claim 4, further comprising:

identifying the network entity for managing the at least two ERs.

6. The method of claim 1, further comprising:

identifying that a second UE located in a second cell of the second base station performs handover to a first cell of the first base station, wherein a public land mobile network (PLMN) of the second base station is different from a PLMN of the first base station;

acquiring a policy control function (PCF) identification (ID) of a PCE for the second UE;

requesting the second UE to communicate with the first base station, based on the acquired PCF ID; and establishing a communication connection with the second UE, based on a response from the second UE.

7. The method of claim 6, further comprising:

instantiating the PCF for the second UE, based on the acquired PCF ID, and requesting the second UE to communicate with the first base station through the instantiated PCF.

8. The method of claim 6, further comprising:

controlling the at least two ERs to establish a communication connection with the second UE; and controlling the at least two ERs to transmit data to the second UE located in the first cell.

9. The method of claim 1, further comprising:

identifying a modulation scheme requested to the at least two ERs in order to use a same frequency band and a same time resource in case that the at least two ERs transmit the data to the first UE; and requesting the at least two ERs to perform data modulation by the identified modulation scheme.

10. A first access and mobility management function (AMF) entity in a wireless communication system, the first AMF entity comprising:

at least one processor; and memory storing instructions that, when executed by the at least one processor individually or collectively, cause the first AMF entity to:

establish a control channel with at least two enhanced relays (ERs) via a first base station managed by the first AMF entity;

transmit, to the at least two ERs via the control channel, a first control message for requesting to establish a communication channel with a second base station managed by a second AMF entity;

control a network entity to access the second AMF entity based on the communication channel being established, wherein the network entity is for delivering control messages between the first AMF entity and the second AMF entity; and control the network entity to transmit a second control message to the at least two ERs, via the second AMF entity and the second base station, wherein the second control message indicates to transmit, to a first user equipment (UE), data received from the communication channel.

11. The first AMF entity of claim 10, wherein the at least two ERs transmit the data to the first UE using a same frequency band and a same time resource.

12. The first AMF entity of claim 10, wherein each of the at least two ERs is allocated a code matrix in order for the at least two ERs to use a same frequency band and a same time resource, and wherein the code matrix is a space-time block code (STBC).

13. The first AMF entity of claim 10, wherein a public land mobile network (PLMN) of the second base station is different from a PLMN of the first base station.

14. The first AMF entity of claim 13, wherein the instructions, when executed by the at least one processor individually or collectively, cause the first AMF entity to:

identify the network entity for managing the at least two ERs.

15. The first AMF entity of claim 10, wherein the instructions, when executed by the at least one processor individually or collectively, cause the first AMF entity to:

identify that a second UE located in a second cell of the second base station performs handover to a first cell of the first base station, wherein a public land mobile network (PLMN) of the second base station is different from a PLMN of the first base station, acquire a policy control function (PCF) identification (ID) of a PCE for the second UE, request the second UE to communicate with the first base station, based on the acquired PCF ID, and establish a communication connection with the second UE, based on a response from the second UE.

16. The first AMF entity of claim 15, wherein the instructions, when executed by the at least one processor individually or collectively, cause the first AMF entity to:

instantiate the PCF for the second UE, based on the acquired PCF ID, and request the second UE to communicate with the first base station through the instantiated PCF.

17. The first AMF entity of claim 15, wherein the instructions, when executed by the at least one processor individually or collectively, cause the first AMF entity to:

control the at least two ERs to establish a communication connection with the second UE, and control the at least two ERs to transmit data to the second UE located in the first cell.

18. The first AMF entity of claim 10, wherein the instructions, when executed by the at least one processor individually or collectively, cause the first AMF entity to:

identify a modulation scheme requested to the at least two ERs in order to use a same frequency band and a same time resource in case that the at least two ERs transmit the data to the first UE, and request the at least two ERs to perform data modulation by the identified modulation scheme.

* * * * *